(12) United States Patent
Liu et al.

(10) Patent No.: US 12,288,027 B2
(45) Date of Patent: Apr. 29, 2025

(54) TEXT SENTENCE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhiyuan Liu, Shenzhen (CN); Hao Peng, Shenzhen (CN); Tianyu Gao, Shenzhen (CN); Xu Han, Shenzhen (CN); Yankai Lin, Shenzhen (CN); Peng Li, Shenzhen (CN); Maosong Sun, Shenzhen (CN); Jie Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 271 days.

(21) Appl. No.: 18/073,517

(22) Filed: Dec. 1, 2022

(65) Prior Publication Data

US 2023/0100376 A1  Mar. 30, 2023

Related U.S. Application Data

(63) Continuation of application No. PCT/CN2021/102688, filed on Jun. 28, 2021.

(30) Foreign Application Priority Data

Aug. 21, 2020 (CN) .......................... 202010847425.1

(51) Int. Cl.
G06F 17/00 (2019.01)
G06F 40/166 (2020.01)
(Continued)

(52) U.S. Cl.
CPC .......... *G06F 40/279* (2020.01); *G06F 40/166* (2020.01); *G06F 40/30* (2020.01)

(58) Field of Classification Search
None
See application file for complete search history.

(56) References Cited

U.S. PATENT DOCUMENTS 9,836,453 B2 * 12/2017 Radford ................. G06F 16/93
10,503,833 B2 * 12/2019 Andrassy .............. G06F 40/295
(Continued)

FOREIGN PATENT DOCUMENTS

CN   107169079 A   9/2017
CN   109961032 A   7/2019
(Continued)

OTHER PUBLICATIONS

Tencent Technology, WO, PCT/CN2021/102688, Sep. 28, 2021, 6 pgs.
(Continued)

*Primary Examiner* — Satwant K Singh
(74) *Attorney, Agent, or Firm* — Morgan, Lewis & Bockius LLP

(57) ABSTRACT

Disclosed is a text sentence processing method performed by a computer device, including: acquiring sample text sentences including entity pairs and relationship labels of the entity pairs; extracting positive and negative example sentence pairs from the sample text sentences according to the relationship labels, and performing positive-negative example sampling, to obtain a training set; inputting the training set into a relationship extraction model to generate loss values; and adjusting parameters of the relationship extraction model according to the loss values, and repeating the step of extracting positive and negative example sentence pairs from the sample text sentences according to the (Continued)

relationship labels to perform iterative training of the relationship extraction model until a training end condition is met, to obtain an updated relationship extraction model, the relationship extraction model being configured to identify an entity relationship of an entity pair in an input text sentence.

20 Claims, 7 Drawing Sheets

(51) Int. Cl.
*G06F 40/279* (2020.01)
*G06F 40/30* (2020.01)

(56) References Cited

U.S. PATENT DOCUMENTS

| | | | |
|---|---|---|---|
| 10,643,145 B2* | 5/2020 | Yu | G06N 5/046 |
| 2020/0042829 A1* | 2/2020 | Wang | G06F 18/28 |
| 2020/0065374 A1* | 2/2020 | Gao | G06N 3/08 |
| 2020/0073933 A1* | 3/2020 | Zhao | G06F 40/117 |
| 2020/0097820 A1 | 3/2020 | Song et al. | |

FOREIGN PATENT DOCUMENTS

| | | |
|---|---|---|
| CN | 110110092 A | 8/2019 |
| CN | 110555060 A | 12/2019 |
| CN | 111274397 A | 6/2020 |
| CN | 111339774 A | 6/2020 |
| CN | 111950269 A | 11/2020 |
| EP | 3582118 A1 | 12/2019 |

OTHER PUBLICATIONS

Tencent Technology, IPRP, PCT/CN2021/102688, Feb. 16, 2023, 7 pgs.
Tencent Technology, ISR, PCT/CN2021/102688, Sep. 28, 2021, 2 pgs.

* cited by examiner

| Dataset | Model | 1% | | | 10% | | | 100% | | |
|---|---|---|---|---|---|---|---|---|---|---|
| | | C+M | OnlyC | OnlyM | C+M | OnlyC | OnlyM | C+M | OnlyC | OnlyM |
| TACRED | BERT | 0.211 | 0.167 | 0.220 | 0.579 | 0.446 | 0.433 | 0.683 | 0.570 | 0.466 |
| | MTB | 0.304 | 0.231 | 0.308 | 0.608 | 0.496 | 0.441 | 0.691 | 0.581 | 0.433 |
| | CP | 0.485 | 0.393 | 0.350 | 0.633 | 0.515 | 0.453 | 0.695 | 0.593 | 0.450 |
| SemEval | BERT | 0.367 | 0.294 | 0.245 | 0.772 | 0.688 | 0.527 | 0.871 | 0.798 | 0.677 |
| | MTB | 0.362 | 0.330 | 0.249 | 0.806 | 0.744 | 0.543 | 0.873 | 0.807 | 0.682 |
| | CP | 0.482 | 0.470 | 0.221 | 0.822 | 0.766 | 0.543 | 0.876 | 0.811 | 0.679 |
| Wiki80 | BERT | 0.559 | 0.413 | 0.463 | 0.829 | 0.413 | 0.655 | 0.913 | 0.810 | 0.781 |
| | MTB | 0.585 | 0.509 | 0.542 | 0.859 | 0.509 | 0.719 | 0.916 | 0.820 | 0.788 |
| | CP | 0.827 | 0.734 | 0.653 | 0.893 | 0.734 | 0.745 | 0.922 | 0.834 | 0.799 |
| ChemProt | BERT | 0.362 | 0.362 | 0.362 | 0.634 | 0.584 | 0.385 | 0.792 | 0.777 | 0.463 |
| | MTB | 0.362 | 0.362 | 0.362 | 0.682 | 0.685 | 0.403 | 0.796 | 0.798 | 0.463 |
| | CP | 0.361 | 0.362 | 0.360 | 0.708 | 0.697 | 0.404 | 0.806 | 0.803 | 0.467 |

| Model | 5-way 1-shot | | | 5-way 5-shot | | | 10-way 1-shot | | | 10-way 5-shot | | |
|---|---|---|---|---|---|---|---|---|---|---|---|---|
| | C+M | OnlyC | OnlyM | C+M | OnlyC | OnlyM | C+M | OnlyC | OnlyM | C+M | OnlyC | OnlyM |
| FewRel 1.0 | | | | | | | | | | | | |
| BERT | 0.931 | 0.866 | 0.703 | 0.946 | 0.925 | 0.804 | 0.842 | 0.779 | 0.575 | 0.908 | 0.876 | 0.715 |
| MTB | 0.931 | 0.879 | 0.727 | 0.954 | 0.939 | 0.835 | 0.843 | 0.779 | 0.568 | 0.918 | 0.892 | 0.742 |
| CP | 0.951 | 0.926 | 0.743 | 0.971 | 0.956 | 0.840 | 0.912 | 0.867 | 0.620 | 0.947 | 0.924 | 0.763 |
| FewRel 2.0 Domain Adaptation | | | | | | | | | | | | |
| BERT | 0.746 | 0.683 | 0.316 | 0.827 | 0.783 | 0.406 | 0.635 | 0.542 | 0.210 | 0.765 | 0.706 | 0.292 |
| MTB | 0.747 | 0.692 | 0.338 | 0.879 | 0.836 | 0.426 | 0.625 | 0.528 | 0.216 | 0.811 | 0.744 | 0.298 |
| CP | 0.797 | 0.745 | 0.335 | 0.849 | 0.840 | 0.437 | 0.681 | 0.601 | 0.213 | 0.798 | 0.738 | 0.297 |

TEXT SENTENCE PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/102688, entitled "TEXT SENTENCE PROCESSING METHOD AND DEVICE, COMPUTER DEVICE AND STORAGE MEDIUM" filed on Jun. 28, 2021, which claims priority to Chinese Patent Application No. 202010847425.1, filed with the State Intellectual Property Office of the People's Republic of China on Aug. 21, 2020, and entitled "TEXT SENTENCE PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a text sentence processing method and apparatus, a computer device, and a storage medium.

BACKGROUND OF THE DISCLOSURE

With the rapid development of computer technologies, the natural language processing technology has gradually been mature. Relationship extraction is an important natural language processing task, which aims to extract structured information from large-scale original texts for use in question answering systems, dialog systems, recommendation systems, search engines, and the like. With the development of neural network models, an increasing number of relationship extraction methods based on feature engineering have emerged.

The current relationship extraction methods usually rely on feature engineering. Most relationship extraction models use entitative word vectors as the main feature of relationship extraction, which causes overfitting to entity names to a certain extent during the relationship extraction. This easily causes error accumulation in a feature construction process, hinders system performance, and results in low accuracy of entity relationship extraction the natural language processing task.

SUMMARY

According to various embodiments provided in this application, a text sentence processing method and apparatus, a computer device, and a storage medium are provided.

A method for training a relationship extraction model is provided, performed by a computer device, the method including:
  acquiring sample text sentences, the sample text sentences including entity pairs and relationship labels of the entity pairs;
  extracting positive example sentence pairs and negative example sentence pairs from the sample text sentences according to the relationship labels, and performing positive-negative example sampling on the positive example sentence pairs and the negative example sentence pairs, to obtain a training set;
  inputting the training set into a relationship extraction model to generate loss values, the loss values including a contrastive loss value, the contrastive loss value being used for representing a difference between a similarity of sentences in the positive example sentence pairs and a similarity of sentences in the negative example sentence pairs; and
  adjusting parameters of the relationship extraction model according to the loss values, and returning to the operation of extracting positive example sentence pairs and negative example sentence pairs from the sample text sentences according to the relationship labels to perform iterative training until a training end condition is met, to obtain an updated relationship extraction model, the updated relationship extraction model being configured to identify an entity relationship of an entity pair in a text sentence.

A text sentence processing apparatus is provided, disposed in a computer device, the apparatus including:
  a sample acquisition module, configured to acquire sample text sentences, the sample text sentences including entity pairs and relationship labels of the entity pairs;
  a sampling module, configured to extract positive example sentence pairs and negative example sentence pairs from the sample text sentences according to the relationship labels, and perform positive-negative example sampling on the positive example sentence pairs and the negative example sentence pairs, to obtain a training set;
  a relationship extraction module, configured to input the training set into a relationship extraction model to generate loss values, the loss values including a contrastive loss value, the contrastive loss value being used for representing a difference between a similarity of sentences in the positive example sentence pairs and a similarity of sentences in the negative example sentence pairs; and
  a parameter adjustment module, configured to adjust parameters of the relationship extraction model according to the loss values, and return to the operation of extracting positive example sentence pairs and negative example sentence pairs from the sample text sentences according to the relationship labels to perform iterative training until a training end condition is met, to obtain an updated relationship extraction model.

A computer device is provided, including a memory and one or more processors, the memory storing computer-readable instructions, the one or more processors, when executing the computer-readable instructions, implementing the operations of the method according to the embodiments.

One or more non-transitory computer-readable storage media are provided, storing computer-readable instructions, the computer-readable instructions, when executed by one or more processors, implementing the operations of the method according to the embodiments of this application.

Details of one or more embodiments of this application are provided in the subsequent accompanying drawings and descriptions. Based on the specification, the accompanying drawings, and the claims of this application, other features, objectives, and advantages of this application become clearer.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

The text sentence processing method provided in this application may be applied to a computer device. The computer device may be a terminal or a server. It may be understood that the text sentence processing method provided in this application may be applied to a terminal, a server, or a system including a terminal and a server, and is realized through interaction between the terminal and the server.

Figure 1:
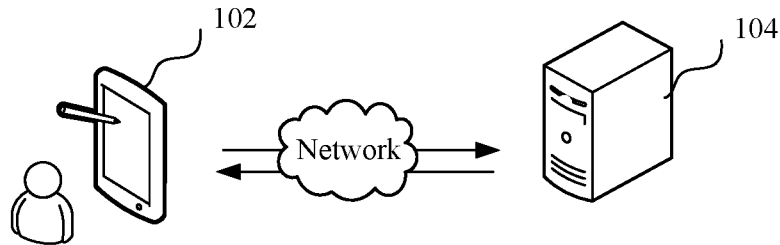
FIG. 1 is a diagram of an application environment of a text sentence processing method according to an embodiment.

The text sentence processing method provided in this application may be applied to the application environment shown in FIG. 1. A terminal 102 communicates with a server 104 through a network. The terminal 102 may be a smartphone, a tablet computer, a notebook computer, a desktop computer, a smart speaker, a smartwatch, or the like, but is not limited thereto. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

Cloud computing is a computing mode, in which computing tasks are distributed on a resource pool formed by a large quantity of computers, so that various application systems can obtain computing power, storage space, and information services according to requirements. A network that provides resources is referred to as a "cloud". As a basic capability provider of cloud computing, a cloud computing resource pool (which is referred to as a cloud platform for short, and is generally referred to as an Infrastructure as a Service (IaaS)) platform is built, and a plurality of types of virtual resources are deployed in the resource pool for external customers to choose for use. The cloud computing resource pool mainly includes: a computing device (which is a virtualized machine, including an operating system), a storage device, and a network device. According to the division of logical functions, a Platform as a Service (PaaS) layer may be deployed on the IaaS layer, and a Software as a Service (SaaS) layer is then deployed on the PaaS layer, or SaaS may be directly deployed on IaaS. PaaS is a platform on which software runs, such as a database or a web container. SaaS is a variety of service software, such as a web portal and image processing software.

Specifically, after acquiring sample text sentences including entity pairs and relationship labels of the entity pairs from the server 104, the terminal 102 extracts positive example sentence pairs and negative example sentence pairs from the sample text sentences according to the relationship labels, and perform positive-negative example sampling on the positive example sentence pairs and the negative example sentence pairs, to obtain a training set. The terminal 102 may input the training set into a relationship extraction model to generate loss values including a contrastive loss value. The contrastive loss value represents a difference between a similarity of sentences in the positive example sentence pairs and a similarity of sentences in the negative example sentence pairs. The terminal 102 may adjust parameters of the relationship extraction model according to the loss values, and return to the step of extracting positive example sentence pairs and negative example sentence pairs from the sample text sentences according to the relationship labels to perform iterative training until a training end condition is met, to obtain a trained relationship extraction model.

It may be understood that the text sentence processing method in the embodiments of this application adopts the machine learning (ML) technology in the artificial intelligence (AI) technologies, and a relationship extraction model capable of accurately extracting entity pair relationships can be trained by using the method. AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have functions of perception, reasoning, and decision-making.

ML is a multi-field interdiscipline and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations. It may be understood that the relationship extraction model trained in some embodiments of this application is trained by using the ML technology, and by training a relationship extraction model based on the ML technology, a relationship extraction model with more accurate relationship extraction can be trained.

Figure 2:
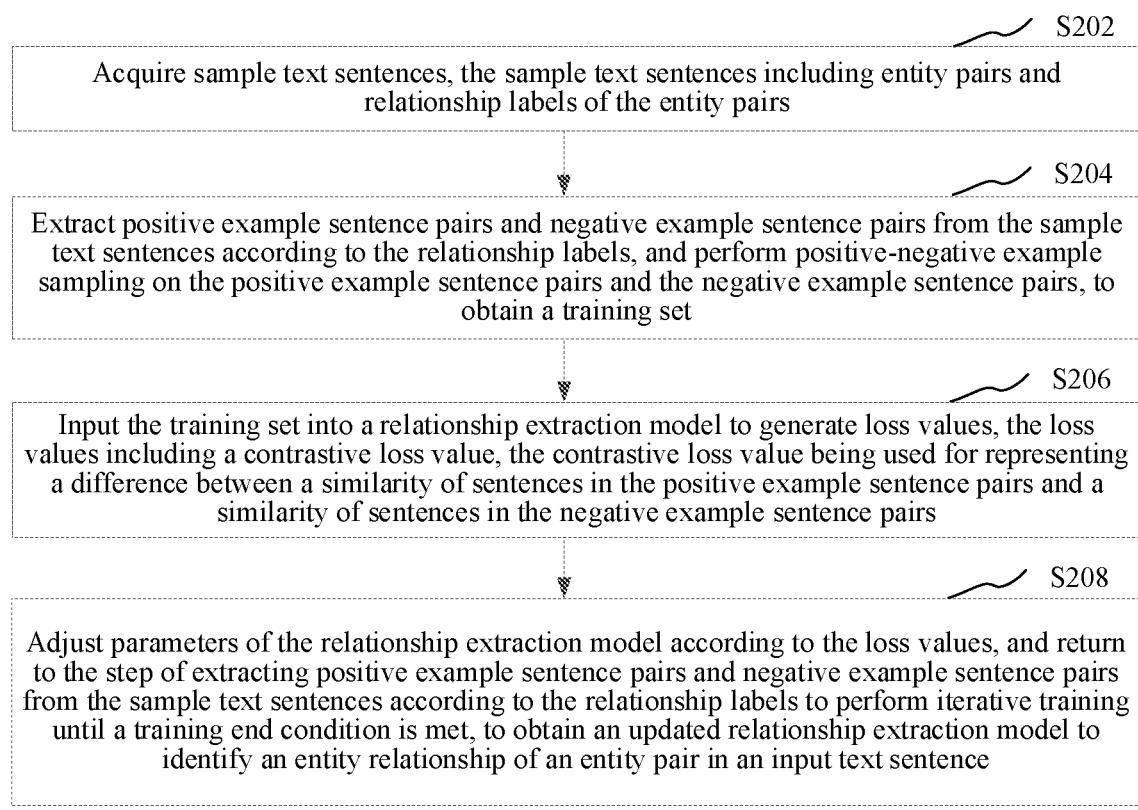
FIG. 2 is a schematic flowchart of a text sentence processing method according to an embodiment.

In an embodiment, as shown in FIG. 2, a text sentence processing method is provided. An example in which the method is applied to a computer device is used for description. The computer device may be the terminal or server in FIG. 1. The method includes the following steps:

S202: Acquire sample text sentences, the sample text sentences including entity pairs and relationship labels of the entity pairs.

The sample text sentences refer to text sentences used for training a relationship extraction model. The sample text sentences include entity pairs and relationship labels of the entity pairs.

It may be understood that the sample text sentences may be acquired in at least one of manners of being acquired from the Internet, inputted from a local input apparatus, and read from a memory. The relationship labels of the entity pairs in the sample text sentences may be obtained through manual annotation or automatic annotation.

In an embodiment, the relationship labels may be automatically annotated on an assumption of a remote supervision algorithm. The assumption of the remote supervision algorithm is that: for a triple (including a pair of entities and a relationship) in an existing knowledge graph database, it is assumed that any sentence in a sample document database including this pair of entities reflects this relationship to a certain extent. Based on the assumption, by using the remote supervision algorithm, the sample text sentences in the sample document database can be annotated with relationship labels based on an annotated knowledge graph, which is equivalent to automatic annotation of the samples.

It may be understood that the sample text sentence may be one sentence. The relationship label records positions of the annotated entity pairs in the sample text sentences, and a relationship between the annotated entity pairs. For example, position information of entities may be annotated in the sample text sentences in a manner of entity identifiers. For example, a sample text sentence may be "<e1>Tsinghua University<e1> is located in <e2>Beijing<e2>", then "<e1>" and "<e2>" respectively represent the corresponding entity identifiers, which can indicate that "Tsinghua University" is an annotated entity 1, and "Beijing" is an annotated entity 2. A relationship label between annotated entity pairs in a sample sentence pair may be represented by a vector or by a relationship type label. For example, a relationship between an entity pair is type 1, which may be represented by a vector. Except for positions at which the relationship type is located being set to 1, all other positions in the vector are set to 0.

An entity refers to a thing that exists objectively independently and is distinguishable.

In an embodiment, the entity may include at least one of a person's name, a place name, a commodity, a name, and the like. For example, "China", "Beijing", and "the Great Wall" are entities.

An entity pair is a pair of entities, that is, including two entities. Entities are the most basic elements in the knowledge graph, and different entities have different relationships. A relationship refers to an association of a property between things, and an entity relationship represents an abstract association between two or more entities. For example, the entity relationship may be described in the form of a triple, which is a data structure of a triple table.

Relationship extraction is to identify a relationship between entities by learning the semantic association between a plurality of entities in a text. An input of relationship extraction is a piece of or a sentence of text, and an output of relationship extraction is usually a triple: <entity 1, relationship, entity 2>. For example, a text "Tsinghua University is an institution of higher learning in Haidian District, Beijing" is inputted, and after relationship extraction, an outputted triple is <Tsinghua University, geographic location, Haidian District, Beijing>, which may alternatively be represented by "geographic location (Tsinghua University, Haidian District, Beijing)". It may be understood that in some cases, two entities may not be related, and may be represented by <entity 1, NA, entity 2>.

Specifically, a relationship extraction model may be a pre-constructed neural network model, for example, a neural network model based on any one or more structures such as bidirectional encoder representations from transformer (BERT), a convolutional neural network (CNN), a deep neural network (DNN), and a long short-term memory neural network (LSTM), which is not limited herein.

In the process of pre-training the relationship extraction model, the computer device first acquires sample text sentence pairs, the sample text sentence pairs including pre-identified entity pairs and relationship labels of the entity pairs, so as to use the sample text sentence pairs to train the relationship extraction model.

S204: Extract positive example sentence pairs and negative example sentence pairs from the sample text sentences according to the relationship labels, and perform positive-negative example sampling on the positive example sentence pairs and the negative example sentence pairs, to obtain a training set.

The process of selecting samples is referred to as sampling, and the sampling manners are different according to different objects. A positive example sentence pair refers to a sentence pair including two sample text sentences of which the relationship labels are the same. A negative example sentence pair refers to a sentence pair including two sample text sentences of which the relationship labels are different.

Specifically, after acquiring the sample text sentences and the relationship labels of the entity pairs, the computer device obtains text sentence pairs with the same relationship by combining the sample text sentences of which the relationship labels are the same in pairs, and uses the sample sentence pairs with the same relationship as positive example sentence pairs. Further, the computer device combines the sample text sentences of which the relationship labels are different to form text sentence pairs with different relationships, and then uses these sample sentence pairs with different relationships as negative example sentence pairs. Therefore, the positive example sentence pairs and the negative example sentence pairs are extracted from the sample text sentences according to the relationship labels.

It may be understood that, among the positive example sentence pairs and the negative example sentence pairs obtained from the sample text sentences, the quantity of negative example sentence pairs far exceeds the quantity of positive example sentence pairs. If only a downsampling manner is used, ineffective use of the negative example sentence pairs may be caused. Therefore, positive-negative example sampling may be performed in each round of training, to obtain training set data of each round.

After obtaining the positive example sentence pairs and the negative example sentence pairs from the sample text sentences, the computer device further performs positive-negative example sampling on the positive example sentence pairs and the negative example sentence pairs, for example, performs sampling in a preset manner, for example, performs sampling according to a preset positive-negative example sampling ratio, so that training samples covering the positive example sentence pairs and the negative example sentence pairs can be obtained, and a training set of this round is generated. By performing positive-negative example sampling, the utilization rate of negative example samples can be effectively improved, so that a training set including positive example samples and negative example samples can be effectively obtained, so as to better learn entity relationship information of positive example sentence pairs and negative example sentence pairs in the process of training the relationship extraction model.

S206: Input the training set into a relationship extraction model to generate loss values, the loss values including a contrastive loss value, the contrastive loss value being used for representing a difference between a similarity of sentences in the positive example sentence pairs and a similarity of sentences in the negative example sentence pairs.

The initial relationship extraction model refers to a relationship extraction model of which model parameters have not been adjusted before training. The relationship extraction model may include a loss function. The loss function is a function that maps a value of a random event or a related random variable thereof to a non-negative real number to represent the "difference" or "loss" of the random event. Used in ML for parameter estimation of models, loss functions are usually associated with optimization problems as learning criteria, that is, solving and evaluating models by minimizing the loss function.

It may be understood that the loss value may be obtained based on the loss function, and the loss value represents a difference between a result predicted by the relationship extraction model and an actual sample label.

The computer device performs positive-negative example sampling on the positive example sentence pairs and the negative example sentence pairs, to obtain a training set, and then inputs the training set obtained this time into the relationship extraction model for relationship extraction processing.

Specifically, an encoding layer in the relationship extraction model encodes each sample text sentence in the training set, and can obtain a word vector representation, a sentence vector representation, a contextual semantic information representation, and the like of each sentence; and fuses these extracted feature vectors to obtain a final vector representation of each sample text sentence. Subsequently, a linear mapping layer in the relationship extraction model obtains a probability distribution of each sample text sentence on all relationship categories according to the final vector representation of each sample text sentence, and a corresponding loss value is obtained, so as to train the relationship extraction model according to the loss value.

After the final vector representation of each sample text sentence is obtained by using the encoding layer of the relationship extraction model, the similarity of the sentences in the positive example sentence pairs and the similarity of the sentences in the negative example sentence pairs are determined by using a similarity extraction layer of the relationship extraction model. A contrastive loss value can be calculated according to a difference between the similarity of the sentences in the positive example sentence pairs and the similarity of the sentences in the negative example sentence pairs.

The contrastive loss value represents the difference between the similarity of the sentences in the positive example sentence pairs and the similarity of the sentences in the negative example sentence pairs. Therefore, by adjusting the parameters of the relationship extraction model according to the loss values, contrastive learning can be effectively performed based on the similarity between positive example sample sentence pairs and negative example sample sentence pairs.

Contrastive learning is to learn representations by maximally improving the consistency between different augmented semantics of the same data samples through a contrastive loss in the latent space. Contrastive self-supervised learning can construct representations by learning encoding. Encoding makes two things similar or different, so that the relationship extraction model continuously learns similar entity relationships during training to improve the accuracy of semantic relationship prediction, which can effectively improve the relationship extraction accuracy of the relationship extraction model.

S208: Adjust parameters of the relationship extraction model according to the loss values, and return to the step of extracting positive example sentence pairs and negative example sentence pairs from the sample text sentences according to the relationship labels to perform iterative training on the relationship extraction model until a training end condition is met, to obtain an updated relationship extraction model, the relationship extraction model being configured to identify an entity relationship of an entity pair in an input text sentence.

It may be understood that in the process of training the relationship extraction model, a plurality of rounds of iterative training need to be performed on the relationship extraction model. Each round of iterative training is to gradually converge the model by adjusting the model parameters of the initial relationship extraction model in this round, to obtain the final relationship extraction model. This round is the current round of model training.

The training end condition means meeting the end condition of model training. For example, the training end condition may be reaching a preset quantity of iterations, or may be that a relationship extraction performance index of the relationship extraction model after parameter adjustment reaches a preset index.

The computer device performs relationship extraction processing on the sample text sentences in the training set by using the relationship extraction model, to obtain the similarity between the sample text sentences and an entity relationship extraction result, and after obtaining the loss values, adjusts the parameters of the relationship extraction model according to the obtained loss values. The computer device further returns to the step of extracting positive example sentence pairs and negative example sentence pairs from the sample text sentences according to the relationship labels, to perform iterative training on the relationship extraction model.

Specifically, the computer device may use the training set obtained by performing positive-negative example sampling on the positive example sentence pairs and the negative example sentence pairs this time as the training set for this round of training. After relationship extraction processing is performed on the training set of this round by using the relationship extraction model, and the loss values are obtained, the parameters of the relationship extraction model of this round are adjusted according to the obtained loss values in the direction of reducing a loss difference.

When the training end condition is not met in this round, it returns to the step of extracting positive example sentence pairs and negative example sentence pairs from the sample text sentences according to the relationship labels, so as to enter the next round. The computer device performs positive-negative example sampling on the positive example sentence pairs and the negative example sentence pairs again to obtain a training set of the next round, and then inputs the training set obtained in the next round into the relationship extraction model for relationship extraction processing, to perform iterative training. When the training end condition is met, the iterative training is ended, thereby obtaining a trained relationship extraction model.

It may be understood that the trained relationship extraction model is a ML model capable of extracting an entity relationship from text sentences, and may be directly applied to relationship extraction processing of text sentences, to identify the entity relationship of entity pairs in text sentences.

In an embodiment, the difference between the predicted relationship extraction result and the relationship label may be measured by a loss function. A function such as a cross entropy function or a mean squared error function may be chosen as the loss function. The computer device may end the training when a value of the loss function is less than a preset value, and obtain an updated relationship extraction model that can be used to accurately and effectively perform entity relationship extraction on texts.

It may be understood that the foregoing relationship extraction model may be applied to relationship extraction tasks in a plurality of scenarios. For example, manners such as supervised learning, semi-supervised learning, unsupervised learning, and few-shot learning may be used to train the relationship extraction model, which is not limited herein.

In an embodiment, supervised model training manner be used. Under supervised learning, the data inputted into the model is training data, and each group of training data has a clear identifier, that is, each group of sample text sentences includes entity pairs and relationship labels of the entity pairs. In the process of training the relationship extraction model in a supervised learning manner, a prediction result of each time and the relationship label of the data in the training set are compared to obtain a corresponding difference, and the parameters of the relationship extraction model are continuously adjusted according to the difference, until the prediction result of the relationship extraction model reaches an expected accuracy rate. The relationship extraction model may use logistic regression, a back propagation neural network), and the like, which is not limited herein.

An example in which the relationship extraction model uses a back propagation algorithm is used. In the process of iteratively training the relationship extraction model, based on the back propagation algorithm, the parameters are updated in the direction of gradient descent, the weights and offsets are adjusted to minimize the overall error, and the parameters of the relationship extraction model are gradually adjusted to iteratively train the relationship extraction model.

In another embodiment, a semi-supervised model training manner may be used. In semi-supervised learning, a large amount of unannotated data may be used, and annotated data may be used for pattern identification work at the same time.

By using semi-supervised learning, the resource consumption of data processing can be effectively reduced, and a relatively high accuracy can be provided. In the semi-supervised training manner, the computer device may only use some sample text sentences including relationship labels of entity pairs and some sample text sentences including no relationship labels of entity pairs as a training set, and input the training set into the relationship extraction model for prediction. and training. In this learning manner, the inputted data is partially annotated and partially unannotated. In this learning and training manner, the model first needs to learn the internal structure of the data, to organize the data appropriately to make predictions. By first attempting to model the unannotated data, and then predicting the annotated data based on this, the computer device may then adjust the parameters of the relationship extraction model according to the loss value of semi-supervised learning, and iteratively train the relationship extraction model.

In the foregoing text sentence processing method, after acquiring sample text sentences including entity pairs and relationship labels of the entity pairs, the computer device extracts positive example sentence pairs and negative example sentence pairs from the sample text sentences according to the relationship labels, and performs positive-negative example sampling on the positive example sentence pairs and the negative example sentence pairs, thereby obtaining an effective positive-negative example training set. The training set is inputted into a relationship extraction model, to generate loss values including a contrastive loss value. The contrastive loss value represents a difference between a similarity of sentences in the positive example sentence pairs and a similarity of sentences in the negative example sentence pairs. Therefore, by adjusting the parameters of the relationship extraction model according to the loss values, contrastive learning can be effectively performed based on the similarity between positive example sample sentence pairs and negative example sample sentence pairs. In addition, it returns to the step of extracting positive example sentence pairs and negative example sentence pairs from the sample text sentences according to the relationship labels to perform iterative training until a training end condition is met, to obtain a trained relationship extraction model. By sampling the positive example sample sentence pairs and the negative example sample sentence pairs, and adjusting the parameters according to the difference between the similarities of the positive example sample sentence pairs and the negative example sample sentence pairs for contrastive learning, the model can better learn the features related to the two entities, thereby effectively improving the relationship extraction accuracy of the relationship extraction model.

Figure 3:
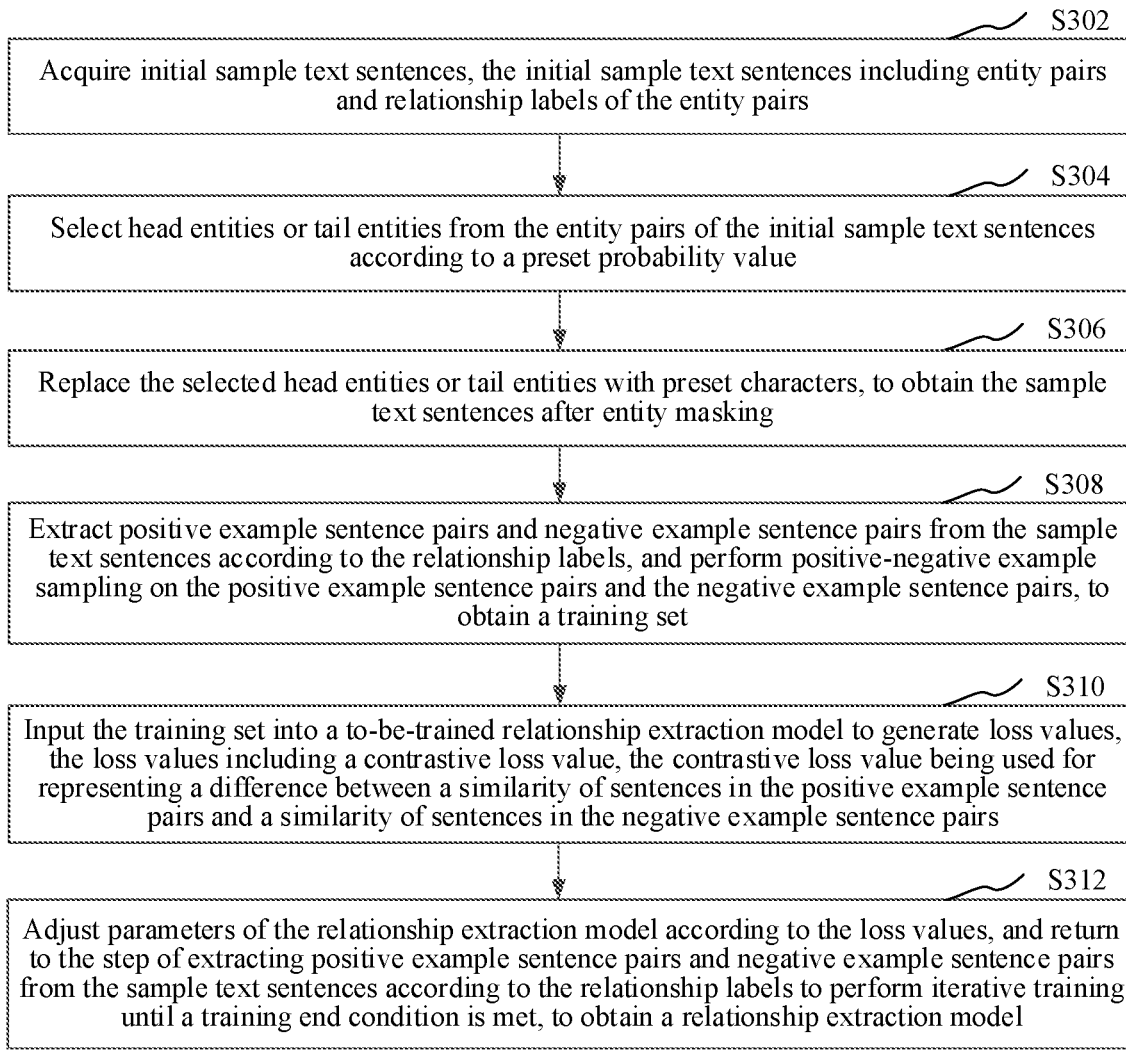
FIG. 3 is a schematic flowchart of a text sentence processing method according to another embodiment.

In an embodiment, as shown in FIG. 3, a schematic flowchart of another text sentence processing method is provided, including the following steps:

S302: Acquire initial sample text sentences, the initial sample text sentences including entity pairs and relationship labels of the entity pairs, the entity pair including a head entity and a tail entity.

S304: Select head entities or tail entities from the entity pairs of the initial sample text sentences according to a preset probability value.

S306: Replace the selected head entities or tail entities with preset characters, to obtain the sample text sentences after entity masking.

S308: Extract positive example sentence pairs and negative example sentence pairs from the sample text sentences according to the relationship labels, and perform positive-negative example sampling on the positive example sentence pairs and the negative example sentence pairs, to obtain a training set.

S310: Input the training set into a relationship extraction model to generate loss values, the loss values including a contrastive loss value, the contrastive loss value being used for representing a difference between a similarity of sentences in the positive example sentence pairs and a similarity of sentences in the negative example sentence pairs.

S312: Adjust parameters of the relationship extraction model according to the loss values, and return to the step of extracting positive example sentence pairs and negative example sentence pairs from the sample text sentences according to the relationship labels to perform iterative training until a training end condition is met, to obtain an updated relationship extraction model.

The entity pair in each sample text sentence includes a head entity and a tail entity, and the head entity and the tail entity may be determined according to a position of the entity in the sample text sentence. For example, the head entity may be the first entity in the sample text sentence, and the tail entity may be the second entity in the same sample text sentence.

It may be understood that entity masking means masking some entities in the sample text sentences of training samples. Specifically, some entities in the sample text sentences may be replaced through mask marking, to mask some entities.

Before acquiring the sample text sentences, the computer device may further acquire original initial sample text sentences. The initial sample text sentences represent initial sample data without preprocessing. The computer device may perform entity masking on the initial sample text sentences according to a preset probability value. The masking of the head entity and the tail entity is independent of each other. For example, in a sample text sentence, the entities may not be masked, one of the entities may be masked, or all of them may be masked.

Specifically, the computer device selects the head entities or the tail entities from the entity pairs of the initial sample text sentences according to the preset probability value, for example, randomly selects some head entities or tail entities from the initial sample text sentences according to a probability of 0.7 for masking. The computer device further replaces the selected head entities or tail entities with preset characters, for example, replaces an entitative word with a special symbol. In an embodiment, the head entity and tail entity may alternatively correspond to a special symbol respectively, which is applicable to all sentences.

By replacing the selected to-be-masked head entities or tail entities with preset characters, the masking performed on the entities is implemented, thereby obtaining sample text sentences after entity masking, and then the sample text sentences after entity masking are further processed.

In this embodiment, by performing entity masking pre-processing on the initial sample text sentences, and masking the head entities or tail entities according to a certain probability, the relationship extraction model can be effectively prevented from overfitting to the entity names. In the process of training the model, not only contextual information can be used more for learning, but also a relatively large separation in downstream tasks can be prevented.

Figure 4:
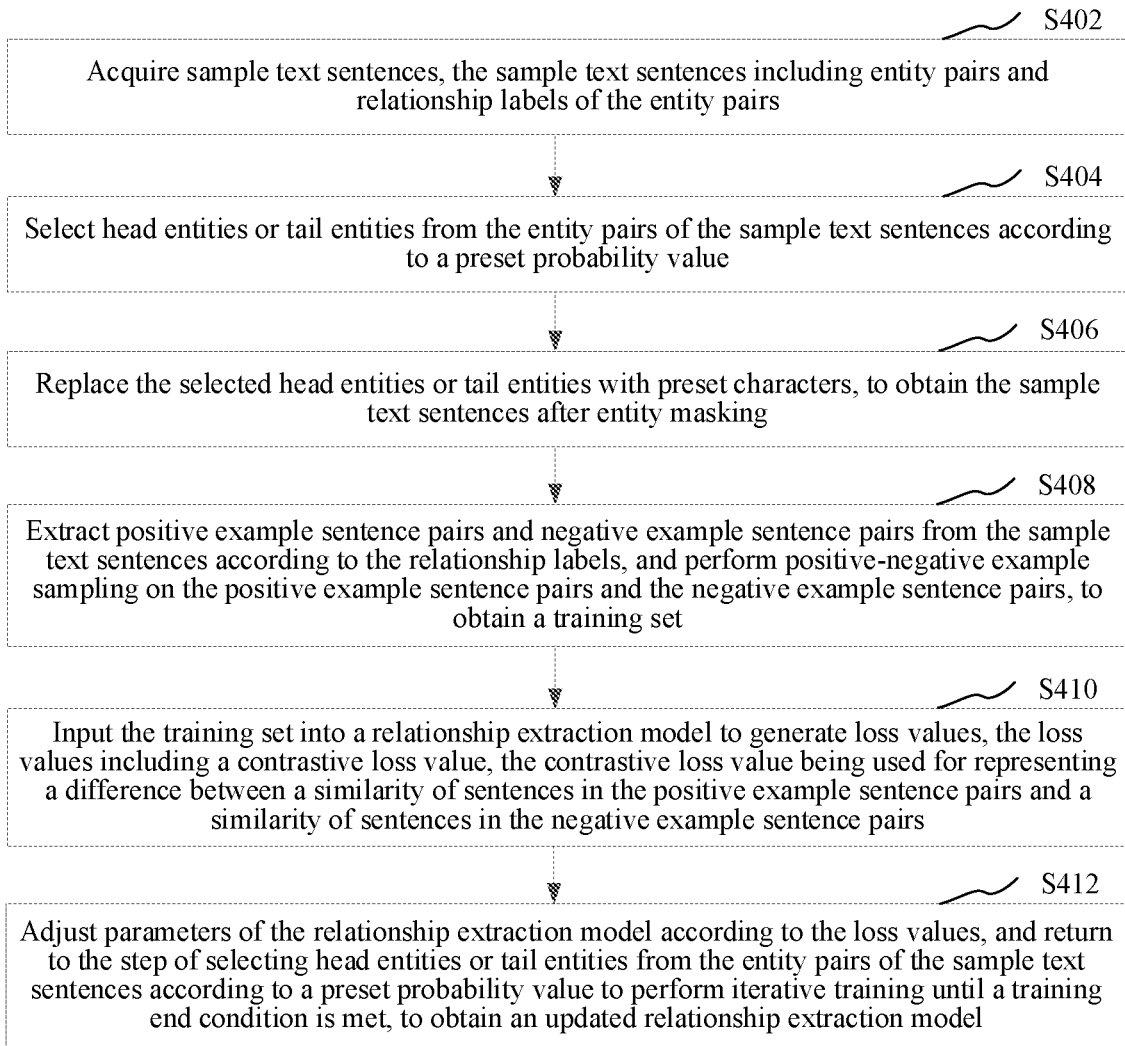
FIG. 4 is a schematic flowchart of a text sentence processing method according to still another embodiment.

In an embodiment, after the adjusting parameters of the relationship extraction model according to the loss values, and before the returning to the step of extracting positive example sentence pairs and negative example sentence pairs from the sample text sentences according to the relationship labels, a step of performing entity masking on the sample text sentences is further performed. As shown in FIG. 4, a schematic flowchart of another text sentence processing method is provided, specifically including the following steps:

S402: Acquire sample text sentences, the sample text sentences including entity pairs and relationship labels of the entity pairs.

S404: Select head entities or tail entities from the entity pairs of the sample text sentences according to a preset probability value.

S406: Replace the selected head entities or tail entities with preset characters, to obtain the sample text sentences after entity masking.

S408: Extract positive example sentence pairs and negative example sentence pairs from the sample text sentences according to the relationship labels, and perform positive-negative example sampling on the positive example sentence pairs and the negative example sentence pairs, to obtain a training set.

S410: Input the training set into a relationship extraction model to generate loss values, the loss values including a contrastive loss value, the contrastive loss value being used for representing a difference between a similarity of sentences in the positive example sentence pairs and a similarity of sentences in the negative example sentence pairs.

S412: Adjust parameters of the relationship extraction model according to the loss values, and return to the step of selecting head entities or tail entities from the entity pairs of the sample text sentences according to a preset probability value to perform iterative training on the relationship extraction model until a training end condition is met, to obtain an updated relationship extraction model.

It may be understood that, in each round of training, after adjusting the parameters of the relationship extraction model according to the loss values in step S412, it returns to perform steps S402 to S406, to perform entity masking on the sample text sentences. Subsequently, based on the sample text sentences after the entity masking, step S408 continues to be performed, to obtain a training set again and continue the next round of training.

That is, in the process of training the relationship extraction model, a manner of dynamic entity masking may be adopted. That is, in the process of each round of the iterative training of the relationship extraction model, entity masking is performed on the sample text sentences.

Specifically, after acquiring the sample text sentences, the computer device may select head entities or tail entities from the entity pairs of the sample text sentences according to a preset probability value, and replace the selected head entities or tail entities with preset characters, to obtain the sample text sentences after entity masking. The computer device subsequently extracts positive example sentence pairs and negative example sentence pairs from the sample text sentences according to the relationship labels, and performs positive-negative example sampling on the positive example sentence pairs and the negative example sentence pairs, to obtain a training set. Further, the computer device inputs the training set into a relationship extraction model to generate loss values, and adjusts the parameters of the relationship extraction model according to the loss values.

Subsequently, after adjusting parameters of the relationship extraction model according to the loss values, and before returning to the step of extracting positive example sentence pairs and negative example sentence pairs from the sample text sentences according to the relationship labels, the computer device further performs a step of performing entity masking on the sample text sentences, to perform entity masking on the sample text sentences again, to obtain updated sample text sentences after entity masking. The computer device further continues to perform the step of extracting positive example sentence pairs and negative example sentence pairs from the sample text sentences after entity masking according to the relationship labels, thereby implementing dynamic entity masking on the sample text sentences in the process of training the relationship extraction model.

In this embodiment, by using the manner of dynamic entity masking, entity masking can be randomly performed on data of each round of training, so that the relationship extraction model can make more use of context information of the sample text sentences after entity masking for learning, thereby effectively improving the relationship extraction accuracy of the relationship extraction model.

In an embodiment, the extracting positive example sentence pairs and negative example sentence pairs from the sample text sentences according to the relationship labels includes: generating a sample sentence package according to sample text sentences of which the relationship labels are the same; combining any two sample text sentences in the sample sentence package, to obtain the positive example sentence pairs; and combining any two sample text sentences of which the relationship labels are different, to obtain the negative example sentence pairs.

The relationship label may be a pre-annotated entity relationship between entity pairs in a sample text sentence.

After acquiring the sample text sentences, the computer device may extract positive example sentence pairs and negative example sentence pairs from the sample text sentences according to the relationship labels. Specifically, the computer device may first acquire sample text sentences of which the relationship labels are the same, and generate a sample sentence package from the sample text sentences of which the relationship labels are the same. Therefore, the relationship labels of all sample text sentences in the generated sample sentence package are the same. The computer device further combines any two sentences in the same package to generate sentence pairs, and the obtained sentence pairs are positive example sentence pairs.

In addition, the computer device combines any two sample text sentences of which the relationship labels are different in the sample sentence package, and a plurality of sentence pairs with different relationship labels can be obtained. These sentence pairs with different relationship labels are negative example sentence pairs.

In this embodiment, by using sample text sentences to generate positive example sentence pairs and negative example sentence pairs according to the relationship labels, all sentence pairs with the same relationship are positive examples, that is, the semantic measurements of these sentence pairs are similar, while all the sentence pairs with different relationships are negative examples, that is, the semantic measurements of these sentence pairs are different. For example, for sentences of which the relationship labels are the same, relationship representations of the positive example sentence pairs obtained by combining the sentences in pairs shall be close under the dot product measurement. For sentences of which the relationship labels are different, relationship representations of the negative example sentence pairs obtained by combining the sentences in pairs shall be far apart under the dot product measurement. Similar semantic features and different semantic features can be better learned by performing contrastive learning training on positive example samples and negative example samples, thereby effectively improving the semantic information extraction accuracy of the relationship extraction model.

In an embodiment, the performing positive-negative example sampling on the positive example sentence pairs and the negative example sentence pairs, to obtain a training set includes: performing sampling and extraction on the positive example sentence pairs and the negative example sentence pairs according to a preset positive-negative example sampling ratio; and generating the training set according to positive example sentence pairs and negative example sentence pairs obtained through the sampling and extraction.

It may be understood that by performing positive-negative example sampling on the sample text sentences, it can be ensured that both the positive example sentence pairs and the negative example sentence pairs are sampled and extracted in the sampling process.

After extracting positive example sentence pairs and negative example sentence pairs from the sample text sentences according to the relationship labels, the computer device further performs sampling and extraction on the positive example sentence pairs and the negative example sentence pairs according to a preset positive-negative example sampling ratio. For example, in the positive-negative example sampling and extraction for the current batch, it is assumed that one batch includes 2N sentences, sentences with the same relationship form positive examples, and sentences with different relationships form negative examples. Therefore, in the batch of this round of training, the positive-negative example sampling ratio between positive examples and negative examples may be set to 1:2N, which can effectively improve the utilization rate of the negative example samples and effectively ensure that both positive example sentences and negative example sentences are included in the sampling process.

In this embodiment, by performing sampling and extraction on the positive example sentence pairs and the negative example sentence pairs according to the preset positive-negative example sampling ratio, both positive examples and negative examples can be sampled, which can effectively improve the utilization rate of the negative example samples. Therefore, the training set obtained through positive-negative example sampling can be better used for model training, so that the performance of semantic relationship information extraction of the relationship extraction model is better.

In an embodiment, the inputting the training set into a relationship extraction model to generate loss values includes: inputting the training set into the relationship extraction model, and extracting semantic relationship features of the sample text sentences in the training set; determining the similarity of the sentences in the positive example sentence pairs and the similarity of the sentences in the negative example sentence pairs according to the semantic relationship features of the sample text sentences; and determining the contrastive loss value according to the similarity of the sentences in the positive example sentence pairs and the similarity of the sentences in the negative example sentence pairs, and generating the loss values according to the contrastive loss value.

The relationship extraction model may include an encoding layer, a similarity extraction layer, and a relationship extraction layer. The encoding layer is configured to extract information such as lexical features, syntactic features, contextual semantic features, and semantic relationship features of sample text sentences. For example, the encoding layer may be a neural network structure based on a BERT encoder, where the encoding layer may include an encoder (transformer encoder) and a decoder (transformer decoder). For example, the encoding layer may include several layers of transformer. For example, 12 layers of transformer may be used.

The similarity extraction layer may be a network layer based on a self-attention mechanism, and is configured to calculate the similarity between the sample text sentences according to semantic relationship features of the sample text sentences. For example, a network structure such as an attention network or a multi-layer perceptron (MLP) may be used. The relationship extraction layer may use a classifier to classify the entity relationships according to the semantic relationship features of the sample text sentences, to obtain a relationship prediction result of the sample text sentences.

Specifically, during each round of model training, after obtaining the training set by performing positive-negative example sampling on the positive example sentence pairs and the negative example sentence pairs, the computer device inputs the obtained training set into the relationship extraction model.

The computer device may perform semantic feature extraction on the sample text sentences in the training set by using the encoding layer of the relationship extraction model. The encoding layer of the relationship extraction model may first extract contextual semantic features of the sample text sentences and entity association features between the entity pairs. The encoding layer further obtains final semantic relationship vector representations of the sample text sentences according to the extracted contextual semantic features and entity association features, the final semantic relationship vector representations being the semantic relationship features of the sample text sentences extracted by using the encoding layer of the relationship extraction model.

Further, after the encoding layer of the relationship extraction model obtains the semantic relationship features of the sample text sentences, the similarity extraction layer of the relationship extraction model calculates the similarity between the sample text sentences in the positive example sentence pairs and the similarity between sample text sentences in the negative example sentence pairs according to the semantic relationship features of the sample text sentences. Therefore, the similarity of the sentences in the positive example sentence pairs and the similarity of the sentences in the negative example sentence pairs predicted by the relationship extraction model are obtained. For example, the similarity of sentences may be obtained by calculating the vector dot product or vector Cosine similarity between sentences, calculated by introducing an additional neural network, or the like, which is not limited herein.

The computer device further determines the contrastive loss value according to the similarity of the sentences in the positive example sentence pairs and the similarity of the sentences in the negative example sentence pairs. The contrastive loss value may specifically be determined according to a difference between a similarity of sentences in the positive example sentence pairs and a similarity of sentences in the negative example sentence pairs. Specifically, the positive example sentence pairs and the negative example sentence pairs may further include actually annotated sample labels. The sample labels of the positive example sentence pairs and the negative example sentence pairs may be determined according to the relationship labels of the sample text sentences, or may be determined according to preset labels corresponding to the positive example samples and the negative example samples.

The difference between the similarity of sentences in positive example sentence pairs and the similarity of sentences in negative example sentence pairs may be determined according to differences between the similarity of the sentences in the positive example sentence pairs and the similarity of the sentences in the negative example sentence pairs predicted by the relationship extraction model and the sample labels of the positive example sentence pairs and the negative example sentence pairs, thereby obtaining the contrastive loss value corresponding to the positive example sentence pairs and the negative example sentence pairs. Further, loss values of the relationship extraction model are generated according to the contrastive loss value, and the parameters of the relationship extraction model are adjusted according to the loss values, so that the contrastive learning can be effectively performed based on the similarities of the positive example sample sentence pairs and the negative example sample sentence pairs, causing the relationship extraction model to continuously learn similar entity relationships during training to improve the prediction accuracy of semantic relationships, thereby effectively improving the relationship extraction accuracy of the relationship extraction model.

In addition, the neural network-based relationship extraction model based on the neural network can better learn the context information of text sentences, thereby effectively improving the robustness and the relationship extraction accuracy of the relationship extraction model.

In an embodiment, the extracting semantic relationship features of the sample text sentences in the training set includes: extracting contextual semantic features and entity association features of the sample text sentences in the training set by using the relationship extraction model; concatenating the contextual semantic features and the entity association features to obtain a concatenated joint feature; and obtaining the semantic relationship features of the sample text sentences according to the concatenated joint feature.

Specifically, after the computer device inputs the training set obtained by performing positive-negative example sampling on the positive example sentence pairs and the negative example sentence pairs into the relationship extraction model, the encoding layer of the relationship extraction model first performs semantic feature extraction on the sample text sentences in the training set. The encoding layer of the relationship extraction model may first extract word vector features of words in the sample text sentences, then extract sentence vector features of the sample text sentences and the position information of each word according to the word vector features, and further extract syntactic features and the like of the sample text sentences. In this way, depth feature extraction can be further performed according to these features, and the contextual semantic features of the sample text sentences and the entity association features between entity pairs can be obtained.

The encoding layer of the relationship extraction model further concatenates the obtained contextual semantic features and entity association features. In this way, final semantic relationship vector representations of the sample text sentences can be obtained according to a concatenated joint feature, the final semantic relationship vector representations being the semantic relationship features of the sample text sentences extracted by using the encoding layer of the relationship extraction model.

Because the sample text sentences include identified entity pairs, the sample text sentences may further include position information of the entity pairs. Therefore, after the sample text sentences are inputted into the relationship extraction model, the encoding layer of the relationship extraction model may directly quickly extract the word vector representations corresponding to the entities according to annotated position information of the entities, which facilitates rapid and accurate semantic relationship feature extraction on the sample text sentences.

In an embodiment, the sample text sentences include the identified entity pairs and position information of the entities. The sample text sentence may further include vectors of the extracted entity pairs and character vectors or word vectors of the characters or words in the sample text sentences. After the computer device performs positive-negative example sampling on the sample text sentences to obtain a training set, and inputs the training set into the relationship extraction model, the relationship extraction model may directly obtain the position information and entity vectors of the entity pairs of the sample text sentences, and character vectors or word vectors of the characters or words in the sample text sentences, and further extract the syntactic features and contextual semantic features of the sample text sentences and entity association features between entity pairs, so as to quickly and accurately obtain semantic relationship representations of the sample text sentences, effectively reduce the amount of computation in the model training process, and effectively improve the training efficiency and training accuracy of the relationship extraction model.

In an embodiment, the positive example sentence pairs and the negative example sentence pairs respectively have corresponding sample labels determined according to the relationship labels; and the determining the contrastive loss value according to the similarity of the sentences in the positive example sentence pairs and the similarity of the sentences in the negative example sentence pairs includes: generating the contrastive loss value according to a difference between the similarity of the sentences in the positive example sentence pairs and the corresponding sample label and a difference between the similarity of the sentences in the negative example sentence pairs and the corresponding sample label.

In the process of extracting positive example sentence pairs and negative example sentence pairs from the sample text sentences according to the relationship labels, to obtain a training set including positive example sentence pairs and negative example sentence pairs, the computer device may further generate sample labels respectively corresponding to positive example samples and negative example samples in the training set.

It may be understood that the relationship labels of entity pairs in the positive example sentence pairs are the same, and the relationship labels of entity pairs in the negative example sentence pairs are different. The computer device may further determine sample labels of the positive example sentence pairs according to the relationship labels, and determine sample labels of the negative example sentence pairs according to the relationship labels.

The sample labels corresponding to the positive example sentence pairs and the negative example sentence pairs respectively may be determined as the actual sample labels of the positive example samples and the negative example samples. Therefore, the positive example sentence pairs and the negative example sentence pairs respectively have corresponding sample labels determined according to the relationship labels. For example, the sample labels of the positive example sentence pairs may be uniformly determined to be 1, and the sample labels of the negative example sentence pairs may be uniformly determined to be 0, so that the actual labels (1 or 0) of the positive example samples and the negative example samples can be obtained.

After inputting the training set into a relationship extraction model, and performs relationship extraction processing on the sample text sentences in the training set by using the relationship extraction model, to obtain the similarity between the sample text sentences and an entity relationship extraction result, the computer device generates a contrastive loss value according to a difference between the similarity of the sentences in the positive example sentence pairs and the corresponding sample label and a difference between the similarity of the sentences in the negative example sentence pairs and the corresponding sample label.

Specifically, the computer device compares the similarity of the sentences in the positive example sentence pairs predicted by the relationship extraction model with the actual sample label of the positive example sentence pairs, for example, calculates a prediction difference between the similarity prediction value of the positive example sentence pairs and the sample label (which is, for example, 1 for the positive examples) to obtain a positive example difference. In addition, the computer device compares the predicted similarity of the sentences in the negative example sentence pairs with the actual sample label of the negative example sentence pairs, for example, calculates a prediction difference between the similarity prediction value of the negative example sentence pairs and the sample label (which is, for example, 0 for the negative examples) to obtain a negative example difference. Further, a contrastive loss value is generated according to the positive example difference and the negative example difference.

The computer device further adjusts the parameters of the relationship extraction model according to the obtained contrastive loss value, and returns to the step of extracting positive example sentence pairs and negative example sentence pairs from the sample text sentences according to the relationship labels, so as to iteratively train the relationship extraction model.

In this embodiment, by calculating differences between the similarity of the sentences in the positive example sentence pairs and the similarity of the sentences in the negative example sentence pairs and the corresponding sample labels respectively, the contrastive loss value is obtained, and the parameters of the relationship extraction model are adjusted according to the contrastive loss value. In this way, contrastive learning can be effectively performed based on the similarities of the positive example sample sentence pairs and the negative example sample sentence pairs.

In an embodiment, the adjusting parameters of the relationship extraction model according to the loss values includes: updating the parameters of the relationship extraction model according to the contrastive loss value, so that during the iterative training of the relationship extraction model, a similarity between positive example sample sentence pairs increases and a similarity between negative example sample sentence pairs decreases.

The contrastive loss value may be determined by using a contrastive loss function of the relationship extraction model. For example, the contrastive loss function may be an NT_XentLoss (the normalized temperature-scaled cross-entropy loss) function.

It is understandable that in the assumption based on remote supervision, if the head entity and tail entity have a certain relationship in the knowledge graph, all sentences including the two entities express this relationship. Generally, if two sentences are annotated with the same entity relationship labels under remote supervision, it can be considered that the two sentences have high similarity, so that their relationship representations shall be close under the click measurement. Conversely, if two sentences are annotated with different entity relationship labels under remote supervision, it can be considered that the two sentences have no similarity, so that their relationship representations shall be far apart under the click measurement.

After obtaining the similarity between sample text sentences by using the relationship extraction model, the computer device calculates the differences between the similarity of the sentences in the positive example sentence pairs and the similarity of the sentences in the negative example sentence pairs and the corresponding sample labels respectively, to obtain the contrastive loss value. The computer device further updates the parameters of the relationship extraction model according to the contrastive loss value.

Specifically, the computer device updates the parameters of the relationship extraction model according to the contrastive loss value, so that during the iterative training of the relationship extraction model, a similarity between positive example sample sentence pairs continuously increases and a similarity between negative example sample sentence pairs continuously decreases. In this way, the relationship extraction model can learn similar features between sentences with the same relationship and distinguish them from other samples.

For example, the predicted similarity and an actual label (0 or 1) may be trained with a binary cross-entropy loss function. During iterative training, the relationship extraction model tends to make a predicted output closer to the actual sample label. For example, a similarity of the predicted output for the positive example sentence pairs closer to the actual sample label 1 indicates a less loss function L; and a predicted output closer to 0 indicates a greater L. A similarity of the predicted output for the negative example sentence pairs closer to the actual sample label 0 indicates a less loss function L; and a predicted output closer to 1 indicates a greater L. By continuously converging the loss function, the change trend of the loss function meets an actually required situation, so as to obtain the required relationship extraction model through training.

In an embodiment, a contrastive loss function may be represented by $L_{CP}$, and the formula of the contrastive loss function may be as follows:

$$L_{CP} = -\log \frac{e^{x_A^T x_B}}{e^{x_A^T x_B} + \sum_{k=1}^{i<2N} e^{x_A^T x_B^i}}$$

where $x_A$ and $x_B$ respectively represent vector representations of a sentence A and a sentence B after encoding, and the relationships of the sentence A and sentence B are the same, but the relationships of the sentence A and the remaining sentences in the training set of the current round are all different. i represents an index of each sentence with a different relationship in the training set, $x_A^T$ represents a transposition of a vector $x_A$ of the sentence A, and $$e^{x_A^T x_B}$$

means first performing vector dot product calculation on the vectors of the two sentences, to obtain the similarity of the two sentences. Subsequently, entity relationship prediction processing is performed by using the relationship extraction model, and the entity relationships of the entity pairs in the sample text sentences are outputted. Therefore, in the process of training the model, an inter-class difference between classifiers in the relationship extraction model can be increased, to improve the accuracy of the entity relationship identification of the relationship extraction model.

In an embodiment, the loss values include a first loss value and a second loss value; the first loss value is the contrastive loss value; and the method further includes: performing mask processing on texts in the sample text sentences in the training set; extracting text context features of the texts in the sample text sentences after the mask processing; performing mask prediction on the sample text sentences according to the text context features, and determining a corresponding cross-entropy loss according to a mask prediction result; and determining a second loss value according to the cross-entropy loss.

The target loss function of the relationship extraction model may include a first loss function and a second loss function, the first loss function may be a contrastive loss function, and the second loss function may be a language model loss function. For example, the first loss function may be a contrastive loss ($L_{CP}$) function, and the second loss function may be a masked language model loss ($L_{MLM}$) function.

After inputting the training set into the relationship extraction model, the computer device obtains semantic relationship features of the sample text sentences by using the encoding layer of the relationship extraction model. Further, the similarity extraction layer of the relationship extraction model calculates the similarity between the sample text sentences in the positive example sentence pairs and the similarity between sample text sentences in the negative example sentence pairs according to the semantic relationship features of the sample text sentences. In addition, the relationship extraction layer of the relationship extraction model performs entity relationship classification according to the semantic relationship features of the sample text sentences. Specifically, a linear mapping layer in the relationship extraction model may be used to obtain probability distributions of the sample text sentences on all relationship sets, thereby obtaining a relationship prediction result of the sample text sentences.

In the process of training the relationship extraction model, the relationship extraction model further performs mask processing on the texts in the sample text sentences in the training set. For example, a masked language model (MLM) may be used to perform a mask prediction task. Specifically, the computer device may perform mask processing on part of the texts in the sample text sentences in a random masking manner. Specifically, preset characters may be used to replace the masked part of texts, that is, part of the input (token) of the sample text sentences may be randomly masked. For example, any text or entity in the sample text sentences may be randomly masked.

The computer device may input the sample text sentences after mask processing into the encoding layer of the relationship extraction model to perform semantic feature extraction. By using the encoding layer of the relationship extraction model, the word vectors and position vectors corresponding to words or texts in the sample text sentences can be extracted, so that the contextual semantic information corresponding to the texts can be obtained according to information such as word vectors and position vectors of the words or the texts, and the contextual semantic features and entity association features corresponding to the sample text sentences can be further extracted.

After extracting the contextual semantic information of the texts in the sample text sentences after mask processing by using the relationship extraction model, the computer device may perform mask prediction on the sample text sentences according to the contextual semantic information of the texts, and then may performs cross-entropy loss calculation according to a mask prediction result, thereby obtaining the cross-entropy loss corresponding to the texts in the sample text sentences.

The computer device may determine a second loss value according to the cross-entropy loss, or may directly use the obtained cross-entropy loss as the second loss value. The second loss value may represent a contextual semantic loss corresponding to the texts in the sample text sentences.

It may be understood that the loss values may be jointly determined by using the first loss value and the second loss value. For example, the loss value of the relationship extraction model may be a sum of the first loss value and the second loss value.

The computer device may adjust parameters of the relationship extraction model according to a total loss value including the first loss value and the second loss value, and return to the step of extracting positive example sentence pairs and negative example sentence pairs from the sample text sentences according to the relationship labels to perform iterative training until a training end condition is met, to obtain an updated relationship extraction model.

In an embodiment, the objective loss function of the relationship extraction model may be expressed as:

$$L = L_{CP} + L_{MLM}$$

where $L_{CP}$ is the first loss function, $L_{MLM}$ is the second loss function, and a target loss function of the relationship extraction model is obtained through joint construction of the first loss function and the second loss function. The first loss value is obtained through the corresponding first loss function, and the second loss value is obtained through the corresponding second loss function. By introducing the $L_{MLM}$ loss function into the relationship extraction model, catastrophic forgetting in the process of training the model can be effectively prevented, and improvement of the capability of the relationship extraction model for semantic understanding can be facilitated.

In this embodiment, the first loss value representing the difference between the similarity of the sentences in the positive example sentence pairs and the similarity of the sentences in the negative example sentence pairs and the second loss value representing the contextual semantic loss corresponding to the texts in the sample text sentences are calculated, and the parameters of the relationship extraction model are jointly adjusted according to the first loss value and the second loss value. In this way, the relationship extraction model can be effectively enabled to perform contrastive learning based on the similarities of the positive example sample sentence pairs and the negative example sample sentence pairs, and the capability of the relationship extraction model for semantic understanding can be effectively improved, to cause the model to gradually converge, thereby effectively improving the relationship extraction accuracy of the relationship extraction model.

Figure 5:
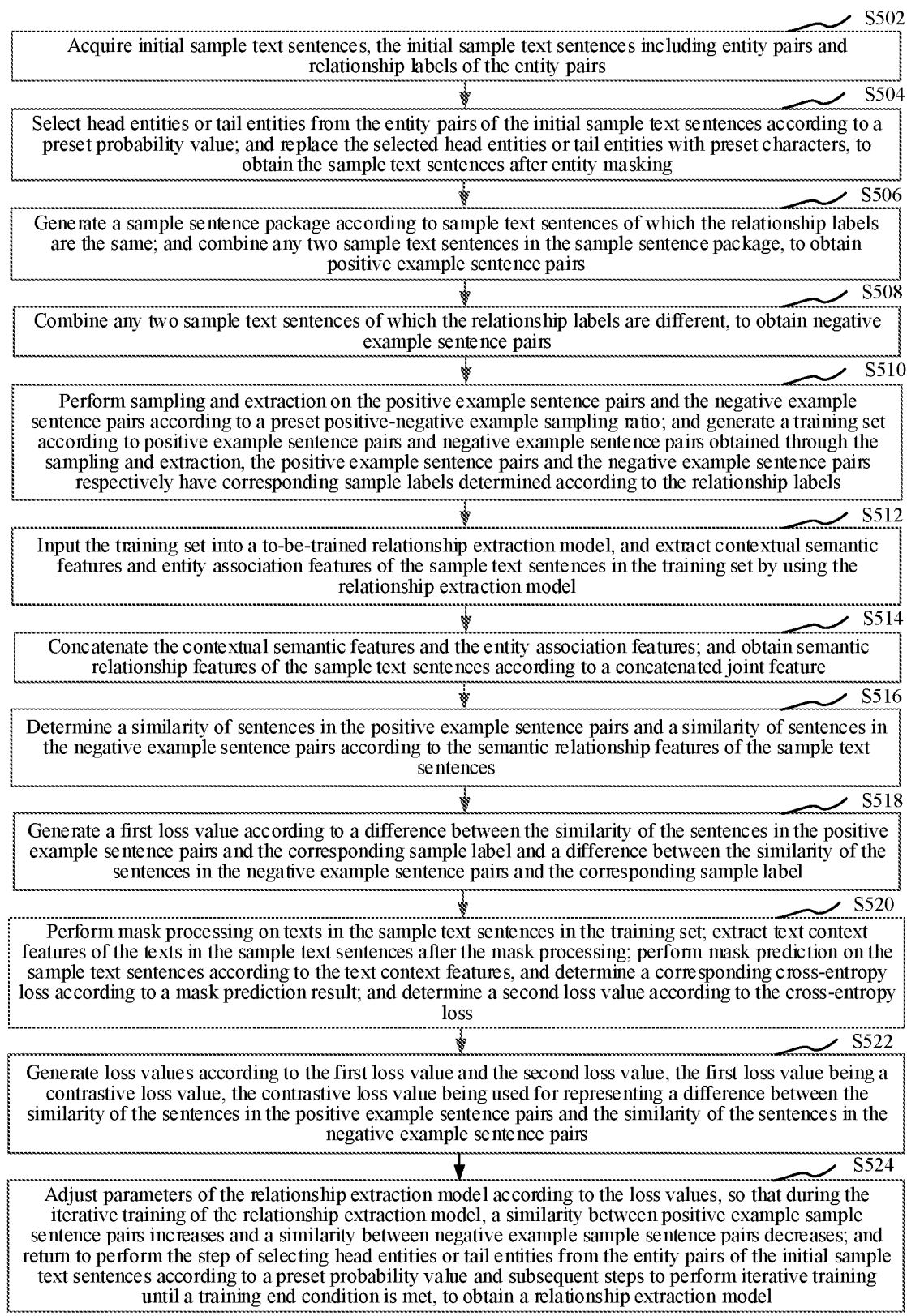
FIG. 5 is a schematic flowchart of a text sentence processing method according to a specific embodiment.

In an embodiment, as shown in FIG. 5, a schematic flowchart of a specific text sentence processing method is provided, including the following steps:

S502: Acquire initial sample text sentences, the initial sample text sentences including entity pairs and relationship labels of the entity pairs.

S504: Select head entities or tail entities from the entity pairs of the initial sample text sentences according to a preset probability value; and replace the selected head entities or tail entities with preset characters, to obtain the sample text sentences after entity masking.

S506: Generate a sample sentence package according to sample text sentences of which the relationship labels are the same; and combine any two sample text sentences in the sample sentence package, to obtain positive example sentence pairs.

S508: Combine any two sample text sentences of which the relationship labels are different, to obtain negative example sentence pairs.

S510: Perform sampling and extraction on the positive example sentence pairs and the negative example sentence pairs according to a preset positive-negative example sampling ratio; and generate a training set according to positive example sentence pairs and negative example sentence pairs obtained through the sampling and extraction, the positive example sentence pairs and the negative example sentence pairs respectively have corresponding sample labels determined according to the relationship labels.

S512: Input the training set into a relationship extraction model, and extract contextual semantic features and entity association features of the sample text sentences in the training set by using the relationship extraction model.

S514: Concatenate the contextual semantic features and the entity association features; and obtain semantic relationship features of the sample text sentences according to a concatenated joint feature.

S516: Determine a similarity of sentences in the positive example sentence pairs and a similarity of sentences in the negative example sentence pairs according to the semantic relationship features of the sample text sentences.

S518: Generate a first loss value according to a difference between the similarity of the sentences in the positive example sentence pairs and the corresponding sample label and a difference between the similarity of the sentences in the negative example sentence pairs and the corresponding sample label.

S520: Perform mask processing on texts in the sample text sentences in the training set; extract text context features of the texts in the sample text sentences after the mask processing; perform mask prediction on the sample text sentences according to the text context features, and determine a corresponding cross-entropy loss according to a mask prediction result; and determine a second loss value according to the cross-entropy loss.

S522: Generate loss values according to the first loss value and the second loss value, the first loss value being a contrastive loss value, the contrastive loss value being used for representing a difference between the similarity of the sentences in the positive example sentence pairs and the similarity of the sentences in the negative example sentence pairs.

S524: Adjust parameters of the relationship extraction model according to the loss values, so that during the iterative training of the relationship extraction model, a similarity between positive example sample sentence pairs increases and a similarity between negative example sample sentence pairs decreases; and return to perform the step of selecting head entities or tail entities from the entity pairs of the initial sample text sentences according to a preset probability value and subsequent steps to perform iterative training until a training end condition is met, to obtain an updated relationship extraction model.

Figure 6:
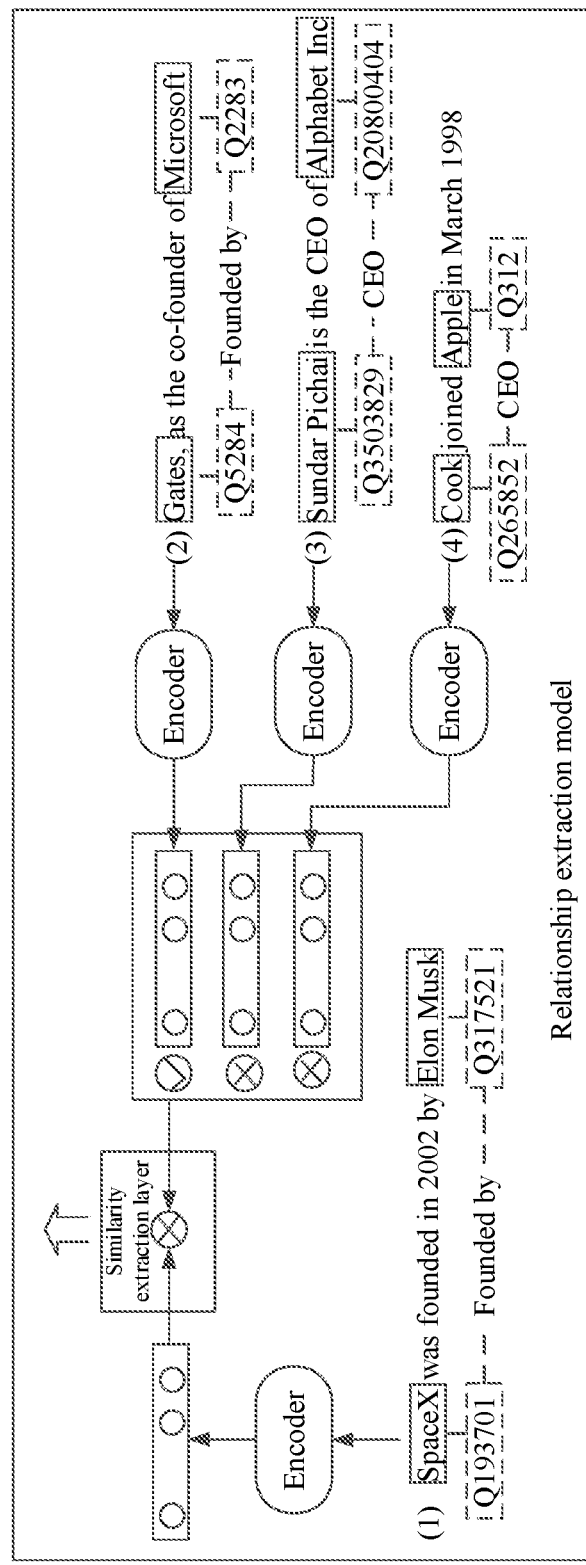
FIG. 6 is a schematic diagram of training a relationship extraction model according to a specific embodiment.

FIG. 6 is a schematic diagram of training a relationship extraction model according to an embodiment. For example, sample text sentences include "(1) SpaceX was founded in 2002 by Elon Musk", "(2) Gates, as the co-founder of Microsoft", "(3) Sundar Pichai is the CEO of Alphabet Inc", "(4) Cook joined Apple in March 1998", and the like. The sample text sentences include entity pairs and relationship labels of the entity pairs, and the entity pairs may further include corresponding position information identifiers and entity vector representations. For example, the entity pair in the first sample text sentence (1) is "SpaceX" and "Elon Musk", the corresponding entity vectors are "Q193701" and "Q317521" respectively, and the relationship label of the entity pair is "founded by".

After the computer device inputs these sample text sentences into the relationship extraction model, the encoder in the relationship extraction model extracts the semantic relationship features of the sample text sentences respectively, where the semantic relationship features may be final vector representations of the sample text sentences extracted by the encoder. The encoder of the relationship extraction model may be a BERT encoder. After the encoder outputs the semantic relationship features of the sample text sentences, the similarity extraction layer calculates the similarity between the sample text sentences, and outputs an entity relationship prediction result of the sample text sentences. Referring to FIG. 6, based on the similarity between the sample text sentences predicted by the relationship extraction model, it can be seen that the first sentence (1) and the second sentence (2) have a high similarity, while the first sentence (1) and the third sentence (3) as well as the fourth sentence (4) have no similarity. The computer device further generates a contrastive loss value based on the difference between the similarity of the sentences in the positive example sentence pairs and the similarity of the sentences in the negative example sentence pairs, adjusts the parameters of the relationship extraction model according to the loss values including the contrastive loss value, and performs iterative training.

In this embodiment, after entity masking is performed on the sample text sentences, positive example sentence pairs and negative example sentence pairs are extracted from the sample text sentences according to the relationship labels, and positive-negative example sampling is performed on the positive example sentence pairs and the negative example sentence pairs, thereby obtaining an effective positive-negative example training set. The training set is inputted into a relationship extraction model, to generate loss values including a contrastive loss value. The contrastive loss value represents a difference between a similarity of sentences in the positive example sentence pairs and a similarity of sentences in the negative example sentence pairs. Therefore, by adjusting the parameters of the relationship extraction model according to the loss values, contrastive learning can be effectively performed based on the similarities of the positive example sample sentence pairs and the negative example sample sentence pairs. In addition, it returns to the step of extracting positive example sentence pairs and negative example sentence pairs from the sample text sentences according to the relationship labels to perform iterative training until a training end condition is met, to obtain a trained relationship extraction model. By performing contrastive learning based on the positive example samples and the negative example samples, and adjusting the parameters according to the difference between the similarities of the positive example sample sentence pairs and the negative example sample sentence pairs, the model can better learn the features related to the two entities, thereby effectively improving the relationship extraction accuracy of the relationship extraction model.

Figures 7, 8, 9:
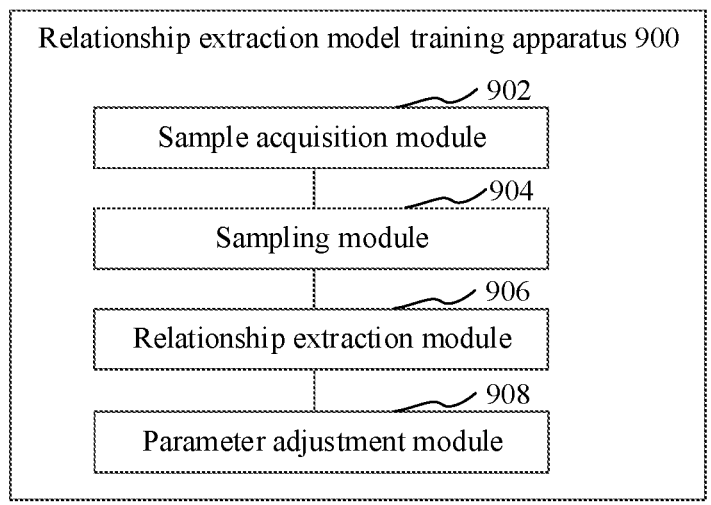
FIG. 7 is a comparison diagram of relationship extraction effects obtained through a test on relationship extraction task datasets by using supervised learning according to an embodiment.
FIG. 8 is a comparison diagram of relationship extraction effects obtained through a test on relationship extraction task datasets by using few-shot learning according to an embodiment.
FIG. 9 is a structural block diagram of a text sentence processing apparatus according to an embodiment.

In a specific experimental test embodiment, a test is performed by acquiring a dataset from a relationship extraction dataset as sample text sentences of a relationship extraction model. The test is performed on relationship extraction task datasets respectively in a supervised learning manner and a few-shot learning manner. FIG. 7 is a comparison diagram of relationship extraction effects obtained through a test on relationship extraction task datasets by using supervised learning. Specifically, in the relationship extraction task using supervised learning, the test data is obtained from the TACRED, SemEval, Wiki80, and Chen-Prot datasets respectively as sample text sentences, an effect experiment is respectively performed on 1%, 10%, and 100% of prior samples, and the corresponding relationship extraction results are outputted by using the pre-trained relationship extraction model. Conventional relationship extraction tasks are also used, for example, obtaining the effects on corresponding relationship extraction task datasets based on the BERT model and the MTB model. FIG. 7 shows relationship extraction effects obtained through a test on corresponding relationship extraction task datasets by respectively using a BERT model (that is, the model corresponding to BERT in the figure), an MTB model (that is, the model corresponding to MTB in the figure), and the relationship extraction model obtained through the foregoing text sentence processing method (that is, the model corresponding to CP in the figure).

FIG. 8 is a comparison diagram of relationship extraction effects obtained through a test on relationship extraction task datasets by using few-shot learning. FIG. 8 shows relationship extraction effects obtained through a test on corresponding relationship extraction task datasets respectively by respectively using a BERT model (that is, the model corresponding to BERT in the figure), an MTB model (that is, the model corresponding to MTB in the figure), and the relationship extraction model obtained through the foregoing text sentence processing method (that is, the model corresponding to CP in the figure), respectively obtaining test data from the datasets FewRel1.0 and FewRel2.0 Donmain Adaptation as sample text sentences, and respectively performing an effect experiment on sample batches of "5-way 1-shot", "5-way 5-shot", "10-way 1-shot", and "10-way 5-shot".

C+M represents a complete input of the entire sentence; OnlyC indicates that only the context is inputted, and the entity is masked; and OnlyM indicates that only the entity is inputted, and the context is not used. As can be seen from FIG. 7 and FIG. 8, the relationship extraction model (that is, the CP model in FIG. 7 and FIG. 8) obtained through the foregoing text sentence processing method is better than the existing models in most relationship extraction tasks. In addition, when only the context information is used, the effect of the relationship extraction model obtained through the foregoing text sentence processing method is relatively more improved. It can be seen from this that the relationship extraction model obtained through the foregoing text sentence processing method (that is, the CP model in the figure) can make better use of context information and perform relationship extraction more accurately, thereby effectively improving the relationship extraction accuracy of the relationship extraction model.

In an embodiment, after the obtaining a relationship extraction model, the method further includes: acquiring a to-be-processed text sentence; identifying an entity pair in the to-be-processed text sentence; and inputting the to-be-processed text sentence and the entity pair into the relationship extraction model, to obtain an entity relationship extraction result of the entity pair in the to-be-processed text sentence.

It may be understood that the to-be-processed text sentence refers to a text sentence on which no task annotation and pre-processing have been performed. After using sample text sentences to iteratively train the relationship extraction model, to obtain a trained relationship extraction model with relatively high relationship extraction accuracy, the pre-trained relationship extraction model may be directly used to process the to-be-processed text sentence to process a relationship extraction task of the text sentence.

Specifically, after acquiring the to-be-processed text sentence, the computer device first identifies entity pairs in the to-be-processed text sentence. The computer device may identify entity pairs in the to-be-processed text sentence according to a preset algorithm, or may identify entity pairs in the to-be-processed text sentence by using a preset language processing model, which is not limited again.

The computer device further inputs the to-be-processed text sentence and the identified entity pairs into the relationship extraction model, extracts a contextual semantic features and an entity association feature of the to-be-processed text sentence by using the relationship extraction model, concatenates the contextual semantic feature and the entity association feature, obtains a semantic relationship feature of the to-be-processed text sentence according to a concatenated joint feature, and then predicts an entity relationship extraction result of the entity pairs in the to-be-processed text sentence according to the semantic relationship feature.

In an embodiment, the relationship extraction model may alternatively be a sub-model of a language processing model. When processing the to-be-processed text sentence, the computer device may first input the to-be-processed text sentence into a pre-trained language processing model, and identify entity pairs of the to-be-processed text sentence by using the language processing model. The computer device further inputs the to-be-processed text sentence and the entity pairs into the relationship extraction model, and performs entity relationship identification on the to-be-processed text sentence by using the relationship extraction model, to output an entity relationship extraction result of the entity pairs in the to-be-processed text sentence.

In this embodiment, because the relationship extraction model is a neural network model with relatively high relationship extraction accuracy obtained through pre-training, the relationship extraction model can accurately and effectively perform relationship extraction processing on the to-be-processed text sentence, thereby obtaining an entity relationship extraction result with relatively high accuracy.

This application further provides an application scenario, which may be applied to a natural language question answering system. The foregoing text sentence processing method is applied in this application scenario. Specifically, the application of the text sentence processing method in this application scenario is as follows:

In a natural language question answering processing system, user equipment obtains an instruction of a user, for example, the user equipment may obtain user input text entered by the user, and initiates an interaction request to the question answering system. The question answering system then performs natural language processing on the user input text, for example, first performs word segmentation, named entity identification, and the like on the user input text to obtain entity information in the user input text. The user input text and the identified entity information are further inputted into a pre-trained relationship extraction model, and an entity relationship extraction result of the entities in the user input text is outputted by using the relationship extraction model. The question answering system may further obtain corresponding response information according to the identified entity relationship extraction result of the user input text and the corresponding semantic information, and return the response information to the user equipment for output, which can effectively improve the semantic understanding capability of the question answering system during the question answering interaction, thereby effectively improving the interaction accuracy of the question answering system.

It is to be understood that, the steps in FIG. 2 to FIG. 5 are sequentially displayed as indicated by arrows, but the steps are not necessarily sequentially performed in an order indicated by the arrows. Unless explicitly specified in this specification, execution of the steps is not strictly limited in the sequence, and the steps may be performed in other sequences. Moreover, at least some of the steps in FIG. 2 to FIG. 5 may include a plurality of steps or a plurality of stages. These steps or stages are not necessarily performed at the same time point, but may be performed at different time points. These steps or stages are not necessarily executed sequentially, but may be performed in turn or alternately with another step or at least some of steps or stages of the another step.

In an embodiment, as shown in FIG. 9, a text sentence processing apparatus 900 is provided. The apparatus may use a software module, a hardware module, or a combination of a software module and a hardware module and become a part of a computer device. The apparatus specifically includes: a sample acquisition module 902, a sampling module 904, a relationship extraction module 906, and a parameter adjustment module 908, where the sample acquisition module 902 is configured to acquire sample text sentences, the sample text sentences including entity pairs and relationship labels of the entity pairs;

the sampling module 904 is configured to extract positive example sentence pairs and negative example sentence pairs from the sample text sentences according to the relationship labels, and perform positive-negative example sampling on the positive example sentence pairs and the negative example sentence pairs, to obtain a training set;

the relationship extraction module 906 is configured to input the training set into a relationship extraction model to generate loss values, the loss values including a contrastive loss value, the contrastive loss value being used for representing a difference between a similarity of sentences in the positive example sentence pairs and a similarity of sentences in the negative example sentence pairs; and the parameter adjustment module 908 is configured to adjust parameters of the relationship extraction model according to the loss values, and return to the step of extracting positive example sentence pairs and negative example sentence pairs from the sample text sentences according to the relationship labels to perform iterative training on the relationship extraction model until a training end condition is met, to obtain an updated relationship extraction model, the updated relationship extraction model being configured to identify an entity relationship of an entity pair in a text sentence.

In an embodiment, the entity pair includes a head entity and a tail entity; and the sample acquisition module 902 is further configured to: acquire initial sample text sentences; select head entities or tail entities from entity pairs of the initial sample text sentences according to a preset probability value; and replace the selected head entities or tail entities with preset characters, to obtain the sample text sentences after entity masking.

In an embodiment, the sample acquisition module 902 is further configured to: select head entities or tail entities from the entity pairs of the sample text sentences according to a preset probability value; and replace the selected head entities or tail entities with preset characters, to obtain the sample text sentences after entity masking.

In an embodiment, the sampling module 904 is further configured to: generate a sample sentence package according to sample text sentences of which the relationship labels are the same; combine any two sample text sentences in the sample sentence package, to obtain the positive example sentence pairs; and combine any two sample text sentences of which the relationship labels are different, to obtain the negative example sentence pairs.

In an embodiment, after the adjusting parameters of the relationship extraction model according to the loss values, and before the returning to the step of extracting positive example sentence pairs and negative example sentence pairs from the sample text sentences according to the relationship labels, the sampling module 904 is further configured to: perform sampling and extraction on the positive example sentence pairs and the negative example sentence pairs according to a preset positive-negative example sampling ratio; and generate the training set according to positive example sentence pairs and negative example sentence pairs obtained through the sampling and extraction.

In an embodiment, the relationship extraction module 906 is further configured to: input the training set into the relationship extraction model, and extract semantic relationship features of the sample text sentences in the training set; determine the similarity of the sentences in the positive example sentence pairs and the similarity of the sentences in the negative example sentence pairs according to the semantic relationship features of the sample text sentences; and determine the contrastive loss value according to the similarity of the sentences in the positive example sentence pairs and the similarity of the sentences in the negative example sentence pairs, and generate the loss values according to the contrastive loss value.

In an embodiment, the relationship extraction module 906 is further configured to: extract contextual semantic features and entity association features of the sample text sentences in the training set by using the relationship extraction model; concatenate the contextual semantic features and the entity association features to obtain a concatenated joint feature; and obtain the semantic relationship features of the sample text sentences according to the concatenated joint feature.

In an embodiment, the positive example sentence pairs and the negative example sentence pairs respectively have corresponding sample labels determined according to the relationship labels; and the relationship extraction module 906 is further configured to: generate the contrastive loss value according to a difference between the similarity of the sentences in the positive example sentence pairs and the corresponding sample label and a difference between the similarity of the sentences in the negative example sentence pairs and the corresponding sample label.

In an embodiment, the parameter adjustment module 908 is further configured to update the parameters of the relationship extraction model according to the contrastive loss value, so that during the iterative training of the relationship extraction model, a similarity between positive example sample sentence pairs increases and a similarity between negative example sample sentence pairs decreases.

In an embodiment, the loss values include a first loss value and a second loss value; the first loss value is the contrastive loss value; and the parameter adjustment module 908 is further configured to: perform mask processing on texts in the sample text sentences in the training set; extract text context features of the texts in the sample text sentences after the mask processing; perform mask prediction on the sample text sentences according to the text context features, and determine a corresponding cross-entropy loss according to a mask prediction result; and determine a second loss value according to the cross-entropy loss.

Figure 10:
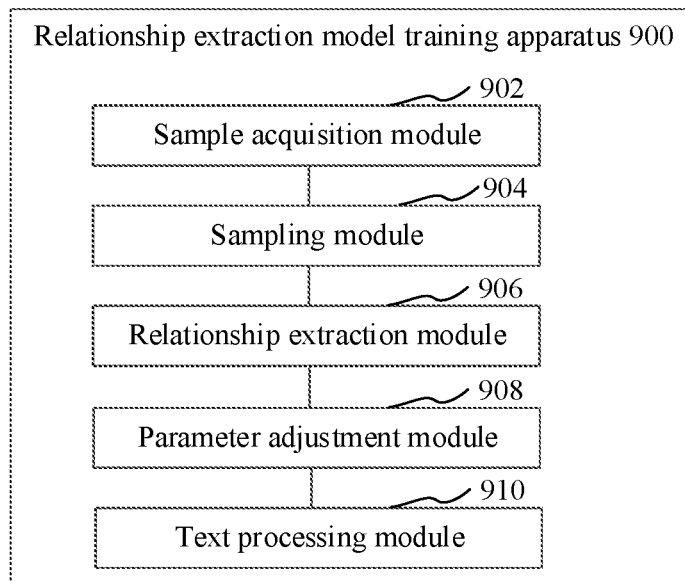
FIG. 10 is a structural block diagram of a text sentence processing apparatus according to another embodiment.
Figure 11:
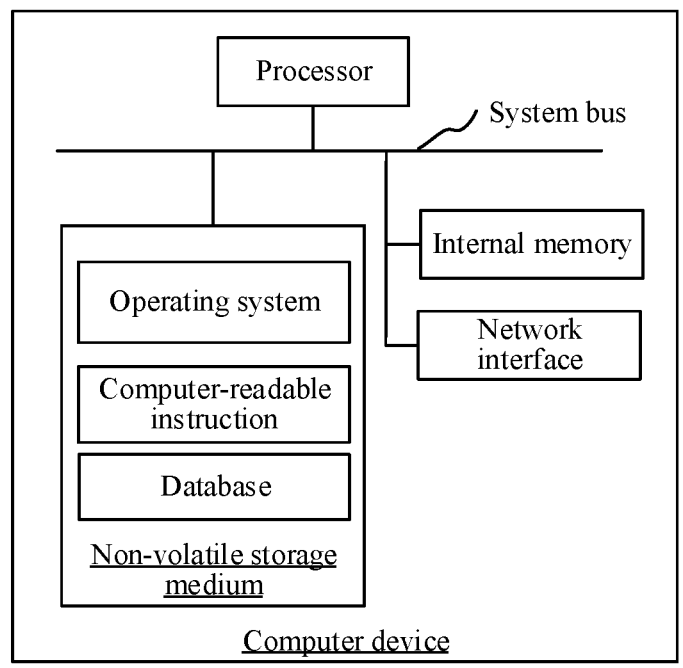
FIG. 11 is a diagram of an internal structure of a computer device according to an embodiment.

In an embodiment, as shown in FIG. 10, the text sentence processing apparatus 900 further includes a text processing module 910, configured to: acquire a to-be-processed text sentence; identify an entity pair in the to-be-processed text sentence; and input the to-be-processed text sentence and the entity pair into the relationship extraction model, to obtain an entity relationship extraction result of the entity pair in the to-be-processed text sentence.

For a specific limitation on the text sentence processing apparatus, reference may be made to the limitation on the text sentence processing method above. Details are not described herein again. All or some of the modules in the foregoing text sentence processing apparatus may be implemented by software, hardware, or a combination thereof. The foregoing modules may be built in or independent of one or more processors of a computer device in a hardware form, or may be stored in a memory of the computer device in a software form, so that the one or more processors invoke and perform an operation corresponding to each of the foregoing modules.

In an embodiment, a computer device is provided. The computer device may be a server, and an internal structure diagram thereof may be shown in FIG. 10. The computer device includes one or more processors, a memory, and a network interface that are connected by using a system bus. The one or more processors of the computer device are configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store data such as sample text sentences, positive example sentence pairs, and negative example sentence pairs. The network interface of the computer device is configured to communicate with an external terminal through a network connection. The computer-readable instructions, when executed by the one or more processors, implements a text sentence processing method.

A person skilled in the art may understand that, the structure shown in FIG. 10 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and one or more processors, the memory storing computer-readable instructions, the one or more processors, when executing the computer-readable instructions, implementing the steps in the foregoing method embodiments.

In an embodiment, one or more computer-readable storage media are provided, storing computer-readable instructions, the computer-readable instructions, when executed by one or more processors, implementing the steps in the foregoing method embodiments.

In an embodiment, a computer-readable instruction product or computer-readable instructions are provided. The computer-readable instruction product or the computer-readable instructions include computer instructions, and the computer instructions are stored in a computer-readable storage medium. One or more processors of the computer device reads the computer instructions from the computer-readable storage medium, and the one or more processors execute the computer instructions, to cause the computer device to perform the steps in the method embodiments.

A person of ordinary skill in the art may understand that all or some procedures in the method in the foregoing embodiments may be implemented by computer-readable instructions instructing related hardware. The computer-readable instructions may be stored in a non-volatile computer-readable storage medium, and when the computer-readable instructions are executed, the procedures in the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope recorded in this specification.

The foregoing embodiments only describe several implementations of this application, which are described specifically and in detail, but cannot be construed as a limitation to the patent scope of the present disclosure. For a person of ordinary skill in the art, several transformations and improvements can be made without departing from the idea of this application, which all fall within the protection scope of this application. Therefore, the protection scope of this application is subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for training a relationship extraction model performed by a computer device, the method comprising:
    acquiring sample text sentences, the sample text sentences comprising entity pairs and relationship labels of the entity pairs;
    extracting positive example sentence pairs and negative example sentence pairs from the sample text sentences according to the relationship labels, and performing positive-negative example sampling on the positive example sentence pairs and the negative example sentence pairs, to obtain a training set;
    inputting the training set into a relationship extraction model to generate loss values, the loss values comprising a contrastive loss value, the contrastive loss value being used for representing a difference between a similarity of sentences in the positive example sentence pairs and a similarity of sentences in the negative example sentence pairs; and
    adjusting parameters of the relationship extraction model according to the loss values, and returning to the operation of extracting positive example sentence pairs and negative example sentence pairs from the sample text sentences according to the relationship labels to perform iterative training until a training end condition is met, to obtain an updated relationship extraction model, the updated relationship extraction model being configured to identify an entity relationship of an entity pair in a text sentence.

2. The method according to claim 1, wherein the entity pair comprises a head entity and a tail entity; and the acquiring sample text sentences comprises:
    acquiring initial sample text sentences;
    selecting head entities or tail entities from entity pairs of the initial sample text sentences according to a preset probability value; and
    replacing the selected head entities or tail entities with preset characters, to obtain the sample text sentences after entity masking.

3. The method according to claim 1, wherein after the adjusting parameters of the relationship extraction model according to the loss values, and before the returning to the operation of extracting positive example sentence pairs and negative example sentence pairs from the sample text sentences according to the relationship labels, the method further comprises:
    selecting head entities or tail entities from the entity pairs of the sample text sentences according to a preset probability value; and replacing the selected head entities or tail entities with preset characters, to obtain the sample text sentences after entity masking.

4. The method according to claim 1, wherein the extracting positive example sentence pairs and negative example sentence pairs from the sample text sentences according to the relationship labels comprises:
generating a sample sentence package according to sample text sentences of which the relationship labels are the same;
combining any two sample text sentences in the sample sentence package, to obtain the positive example sentence pairs; and
combining any two sample text sentences of which the relationship labels are different, to obtain the negative example sentence pairs.

5. The method according to claim 1, wherein the performing positive-negative example sampling on the positive example sentence pairs and the negative example sentence pairs, to obtain a training set comprises:
performing sampling and extraction on the positive example sentence pairs and the negative example sentence pairs according to a preset positive-negative example sampling ratio; and
generating the training set according to positive example sentence pairs and negative example sentence pairs obtained through the sampling and extraction.

6. The method according to claim 1, wherein the inputting the training set into a relationship extraction model to generate loss values comprises:
inputting the training set into the relationship extraction model, and extracting semantic relationship features of the sample text sentences in the training set;
determining the similarity of the sentences in the positive example sentence pairs and the similarity of the sentences in the negative example sentence pairs according to the semantic relationship features of the sample text sentences; and
determining the contrastive loss value according to the similarity of the sentences in the positive example sentence pairs and the similarity of the sentences in the negative example sentence pairs, and generating the loss values according to the contrastive loss value.

7. The method according to claim 6, wherein the extracting semantic relationship features of the sample text sentences in the training set comprises:
extracting contextual semantic features and entity association features of the sample text sentences in the training set by using the relationship extraction model;
concatenating the contextual semantic features and the entity association features to obtain a concatenated joint feature; and
obtaining the semantic relationship features of the sample text sentences according to the concatenated joint feature.

8. The method according to claim 6, wherein the positive example sentence pairs and the negative example sentence pairs respectively have corresponding sample labels determined according to the relationship labels; and
the determining the contrastive loss value according to the similarity of the sentences in the positive example sentence pairs and the similarity of the sentences in the negative example sentence pairs comprises:
generating the contrastive loss value according to a difference between the similarity of the sentences in the positive example sentence pairs and the corresponding sample label and a difference between the similarity of the sentences in the negative example sentence pairs and the corresponding sample label.

9. The method according to claim 1, wherein the adjusting parameters of the relationship extraction model according to the loss values comprises:
updating the parameters of the relationship extraction model according to the contrastive loss value, so that during the iterative training of the relationship extraction model, a similarity between positive example sample sentence pairs increases and a similarity between negative example sample sentence pairs decreases.

10. The method according to claim 6, wherein the loss values comprise a first loss value and a second loss value; the first loss value is the contrastive loss value; and the method further comprises:
performing mask processing on texts in the sample text sentences in the training set;
extracting text context features of the texts in the sample text sentences after the mask processing; and
performing mask prediction on the sample text sentences according to the text context features, and determining a corresponding cross-entropy loss according to a mask prediction result; and determining the second loss value according to the cross-entropy loss.

11. The method according to claim 1, wherein after the obtaining an updated relationship extraction model, the method further comprises:
acquiring a text sentence;
identifying an entity pair in the text sentence; and
inputting the text sentence and the entity pair into the updated relationship extraction model, to obtain an entity relationship extraction result of the entity pair in the text sentence.

12. A computer device, comprising a memory and one or more processors, the memory storing computer-readable instructions that, when executed by the one or more processors, cause the computer device to perform a method for training a relationship extraction model including:
extracting positive example sentence pairs and negative example sentence pairs from the sample text sentences according to the relationship labels, and performing positive-negative example sampling on the positive example sentence pairs and the negative example sentence pairs, to obtain a training set;
inputting the training set into a relationship extraction model to generate loss values, the loss values comprising a contrastive loss value, the contrastive loss value being used for representing a difference between a similarity of sentences in the positive example sentence pairs and a similarity of sentences in the negative example sentence pairs; and
adjusting parameters of the relationship extraction model according to the loss values, and returning to the operation of extracting positive example sentence pairs and negative example sentence pairs from the sample text sentences according to the relationship labels to perform iterative training until a training end condition is met, to obtain an updated relationship extraction model, the updated relationship extraction model being configured to identify an entity relationship of an entity pair in a text sentence.

13. The computer device according to claim 12, wherein the entity pair comprises a head entity and a tail entity; and the acquiring sample text sentences comprises:
acquiring initial sample text sentences;

selecting head entities or tail entities from entity pairs of the initial sample text sentences according to a preset probability value; and replacing the selected head entities or tail entities with preset characters, to obtain the sample text sentences after entity masking.

14. The computer device according to claim 12, wherein after the adjusting parameters of the relationship extraction model according to the loss values, and before the returning to the operation of extracting positive example sentence pairs and negative example sentence pairs from the sample text sentences according to the relationship labels, the method further comprises:

selecting head entities or tail entities from the entity pairs of the sample text sentences according to a preset probability value; and replacing the selected head entities or tail entities with preset characters, to obtain the sample text sentences after entity masking.

15. The computer device according to claim 12, wherein the extracting positive example sentence pairs and negative example sentence pairs from the sample text sentences according to the relationship labels comprises:

generating a sample sentence package according to sample text sentences of which the relationship labels are the same;

combining any two sample text sentences in the sample sentence package, to obtain the positive example sentence pairs; and combining any two sample text sentences of which the relationship labels are different, to obtain the negative example sentence pairs.

16. The computer device according to claim 12, wherein the performing positive-negative example sampling on the positive example sentence pairs and the negative example sentence pairs, to obtain a training set comprises:

performing sampling and extraction on the positive example sentence pairs and the negative example sentence pairs according to a preset positive-negative example sampling ratio; and generating the training set according to positive example sentence pairs and negative example sentence pairs obtained through the sampling and extraction.

17. The computer device according to claim 12, wherein the inputting the training set into a relationship extraction model to generate loss values comprises:

inputting the training set into the relationship extraction model, and extracting semantic relationship features of the sample text sentences in the training set;

determining the similarity of the sentences in the positive example sentence pairs and the similarity of the sentences in the negative example sentence pairs according to the semantic relationship features of the sample text sentences; and determining the contrastive loss value according to the similarity of the sentences in the positive example sentence pairs and the similarity of the sentences in the negative example sentence pairs, and generating the loss values according to the contrastive loss value.

18. The computer device according to claim 12, wherein the adjusting parameters of the relationship extraction model according to the loss values comprises:

updating the parameters of the relationship extraction model according to the contrastive loss value, so that during the iterative training of the relationship extraction model, a similarity between positive example sample sentence pairs increases and a similarity between negative example sample sentence pairs decreases.

19. The computer device according to claim 12, wherein after the obtaining an updated relationship extraction model, the method further comprises:

acquiring a text sentence;

identifying an entity pair in the text sentence; and inputting the text sentence and the entity pair into the updated relationship extraction model, to obtain an entity relationship extraction result of the entity pair in the text sentence.

20. One or more non-transitory computer-readable storage media, storing computer-readable instructions that, when executed by one or more processors of a computer device, cause the computer device to perform a method for training a relationship extraction model including:

extracting positive example sentence pairs and negative example sentence pairs from the sample text sentences according to the relationship labels, and performing positive-negative example sampling on the positive example sentence pairs and the negative example sentence pairs, to obtain a training set;

inputting the training set into a relationship extraction model to generate loss values, the loss values comprising a contrastive loss value, the contrastive loss value being used for representing a difference between a similarity of sentences in the positive example sentence pairs and a similarity of sentences in the negative example sentence pairs; and adjusting parameters of the relationship extraction model according to the loss values, and returning to the operation of extracting positive example sentence pairs and negative example sentence pairs from the sample text sentences according to the relationship labels to perform iterative training until a training end condition is met, to obtain an updated relationship extraction model, the updated relationship extraction model being configured to identify an entity relationship of an entity pair in a text sentence.

* * * * *